United States Patent [19]

Chuang et al.

[11] Patent Number: 4,905,188
[45] Date of Patent: Feb. 27, 1990

[54] FUNCTIONAL CACHE MEMORY CHIP ARCHITECTURE FOR IMPROVED CACHE ACCESS

[75] Inventors: Chiao-Mei Chuang, Briarcliff Manor; Richard E. Matick, Peekskill; Fred T. Tong, Hopewell Junction, all of N.Y.

[73] Assignee: International Business Machines Corporation, Armonk, N.Y.

[21] Appl. No.: 158,964

[22] Filed: Feb. 22, 1988

[51] Int. Cl.⁴ .................. G06F 12/00; G06F 13/00
[52] U.S. Cl. .................. 364/900; 364/964.964.2; 364/927.8
[58] Field of Search ... 364/200 MS File, 900 MS File

[56] References Cited

U.S. PATENT DOCUMENTS

| 4,156,906 | 5/1979 | Ryan | 364/200 |
| 4,437,149 | 3/1984 | Pomerene et al. | 364/200 |
| 4,489,378 | 12/1984 | Dixon et al. | 364/200 |
| 4,490,782 | 12/1984 | Dixon et al. | 364/200 |
| 4,577,293 | 3/1986 | Matick et al. | 365/189 |
| 4,797,813 | 1/1989 | Igarashi | 364/200 |
| 4,811,208 | 3/1989 | Myers et al. | 364/200 |

Primary Examiner—Gareth D. Shaw
Assistant Examiner—Kevin A. Kriess
Attorney, Agent, or Firm—Roy R. Schlemmer, Jr.

[57] ABSTRACT

An on-chip VLSI cache architecture including a single-port, last-select, cache array organized as an n-way set-associative cache (having n congruence classes) including a plurality of functionally integrated units on-chip in addition to the cache array and including a normal read/write CPU access function which provides an architectural organization for allowing the chip to be used in (1) a fast, "late-select" operation which may be provided with any desired degree of set-associativity while achieving an effective one-cycle write operation, and (2) a cache reload function which provides a highly parallel store-back and reload operation to substantially reduce the reload time, particularly for a store-in cache organization. The cache chip organization and architecture provide a late-select cache having a nearly transparent, multiple word reload by incorporating a Cache-Reload Buffer, a store-back buffer and a load-through function all included on the cache array chip for reloading, and a delayed write-enable for achieving an effective one-cycle write operation. Two separate decoder functions are integrated on the chip, one for cache access for normal read/write operations to and from the CPU and one for cache reload which also provides interim access to data which has been transferred out of main memory to the chip but not yet reloaded into the cache array. These two decoders provide for different accessing modes as required of the CPU or main memory operations.

17 Claims, 23 Drawing Sheets

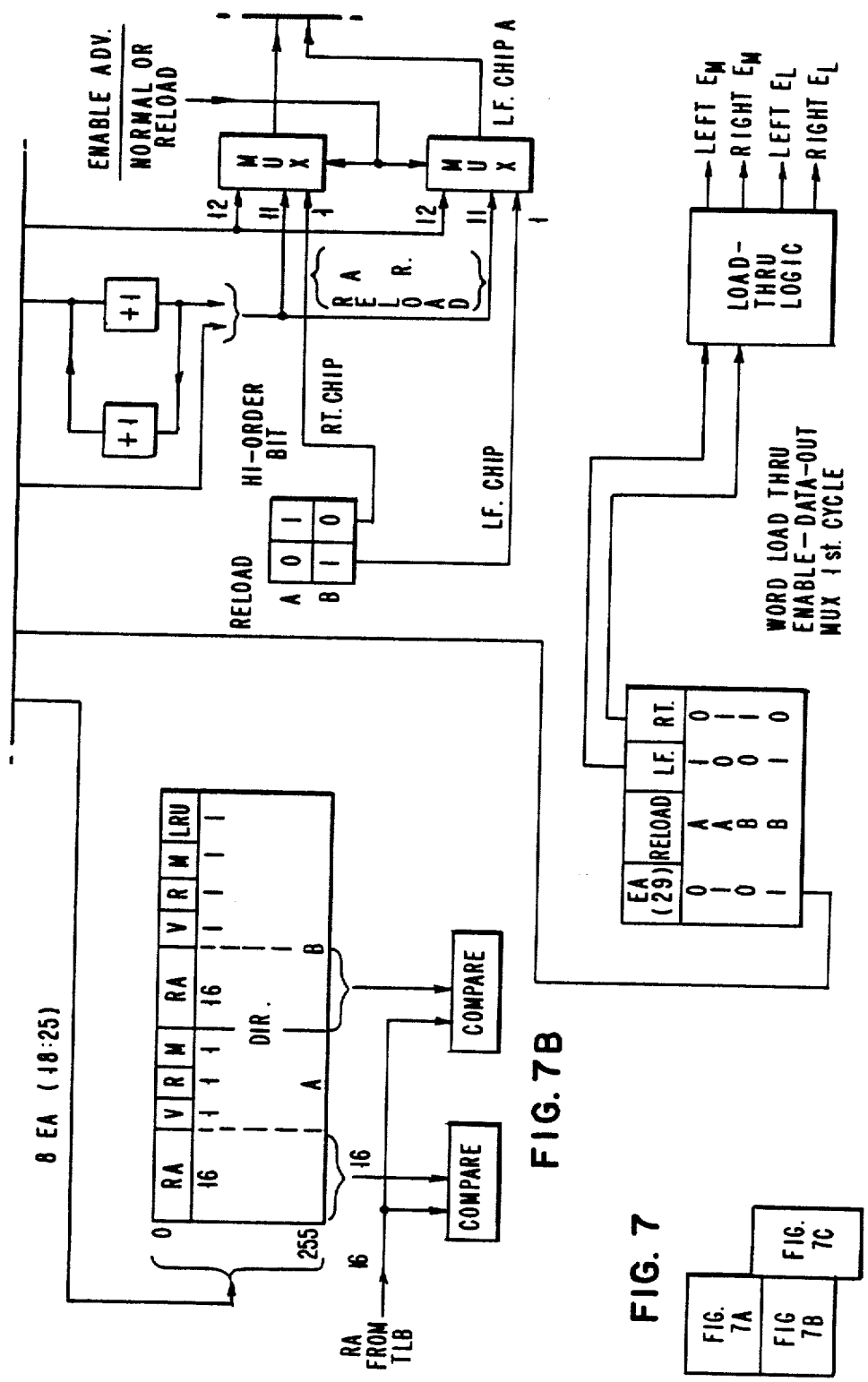

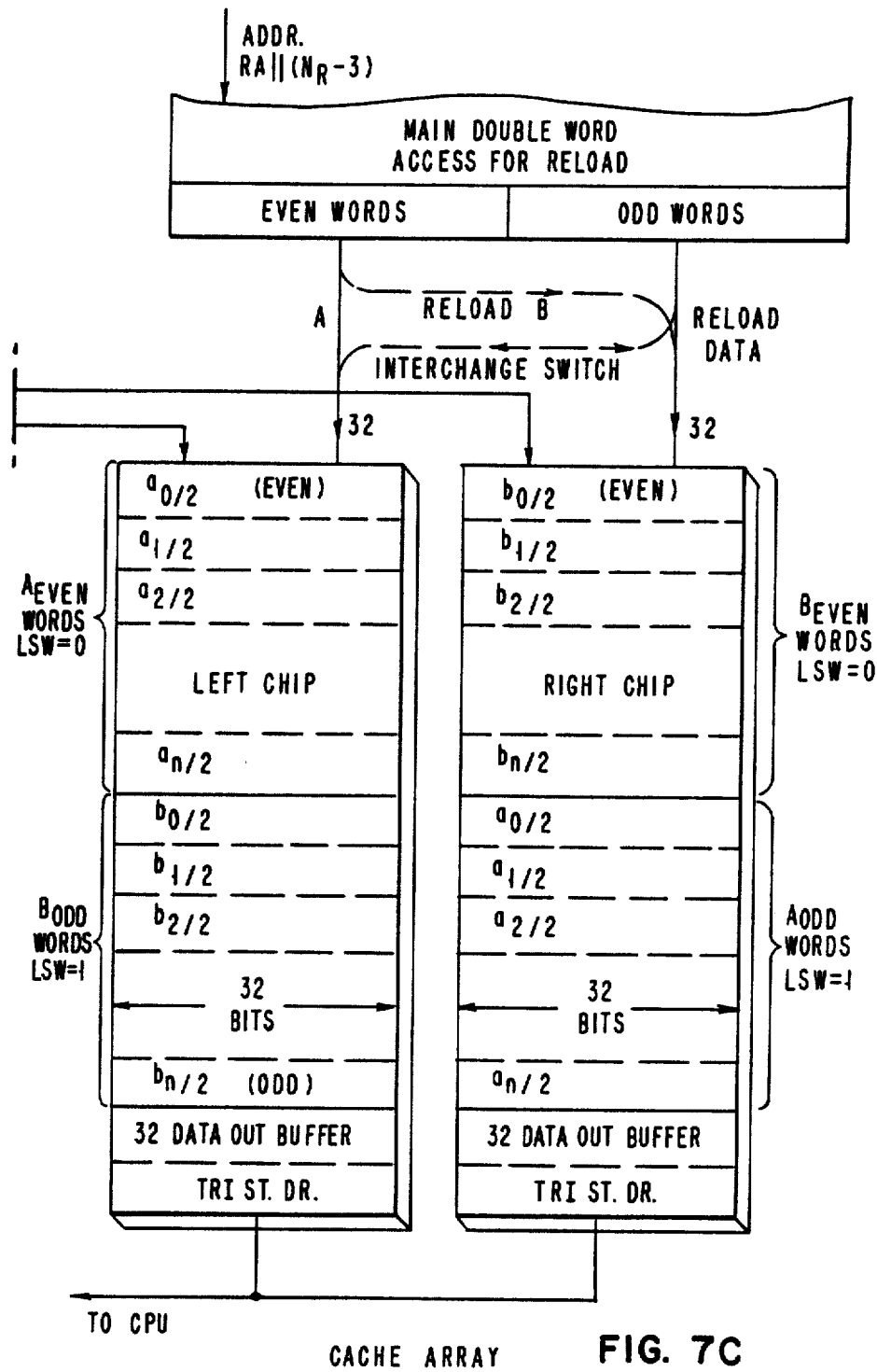
FIG. 7C CACHE ARRAY

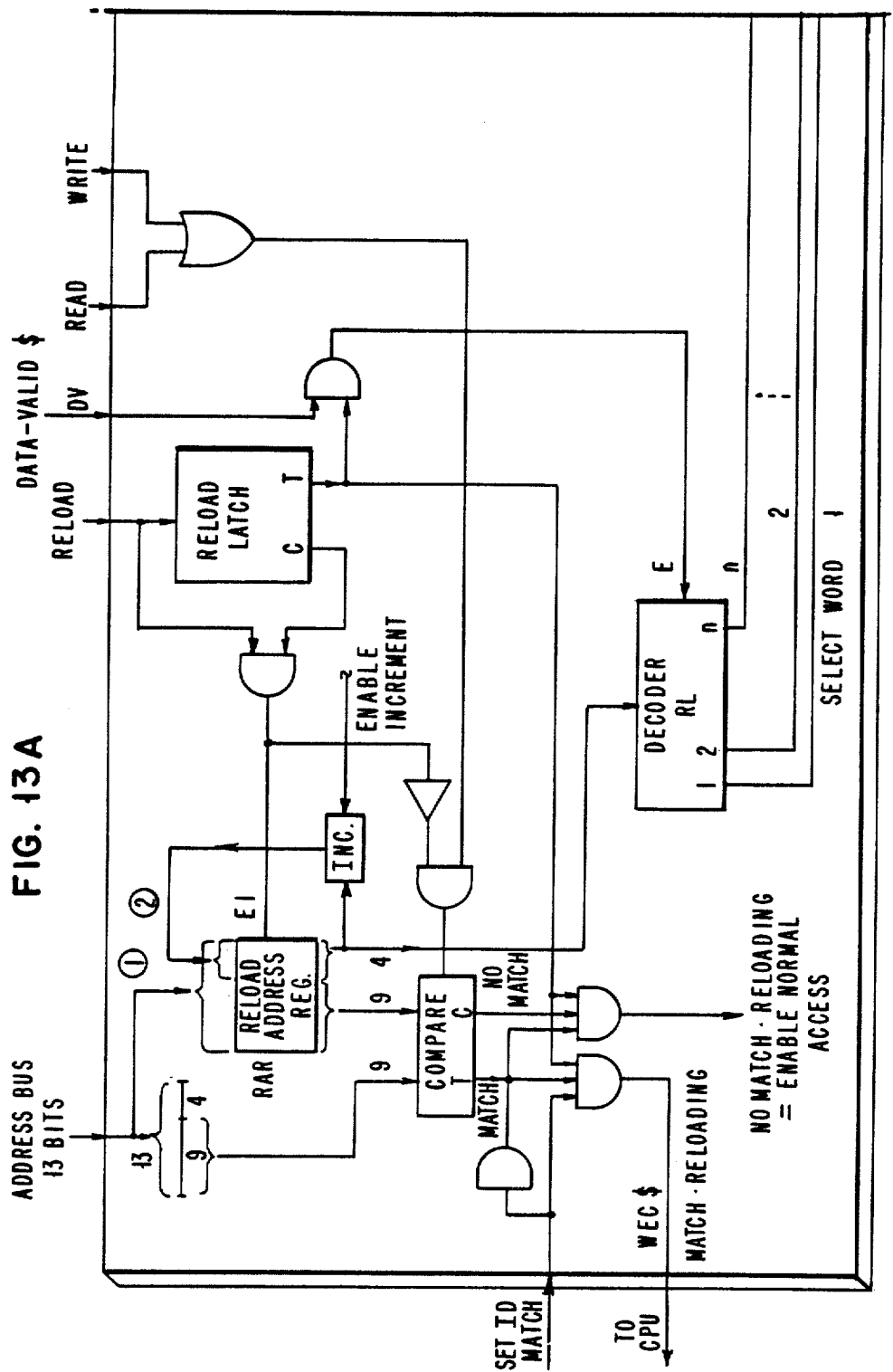

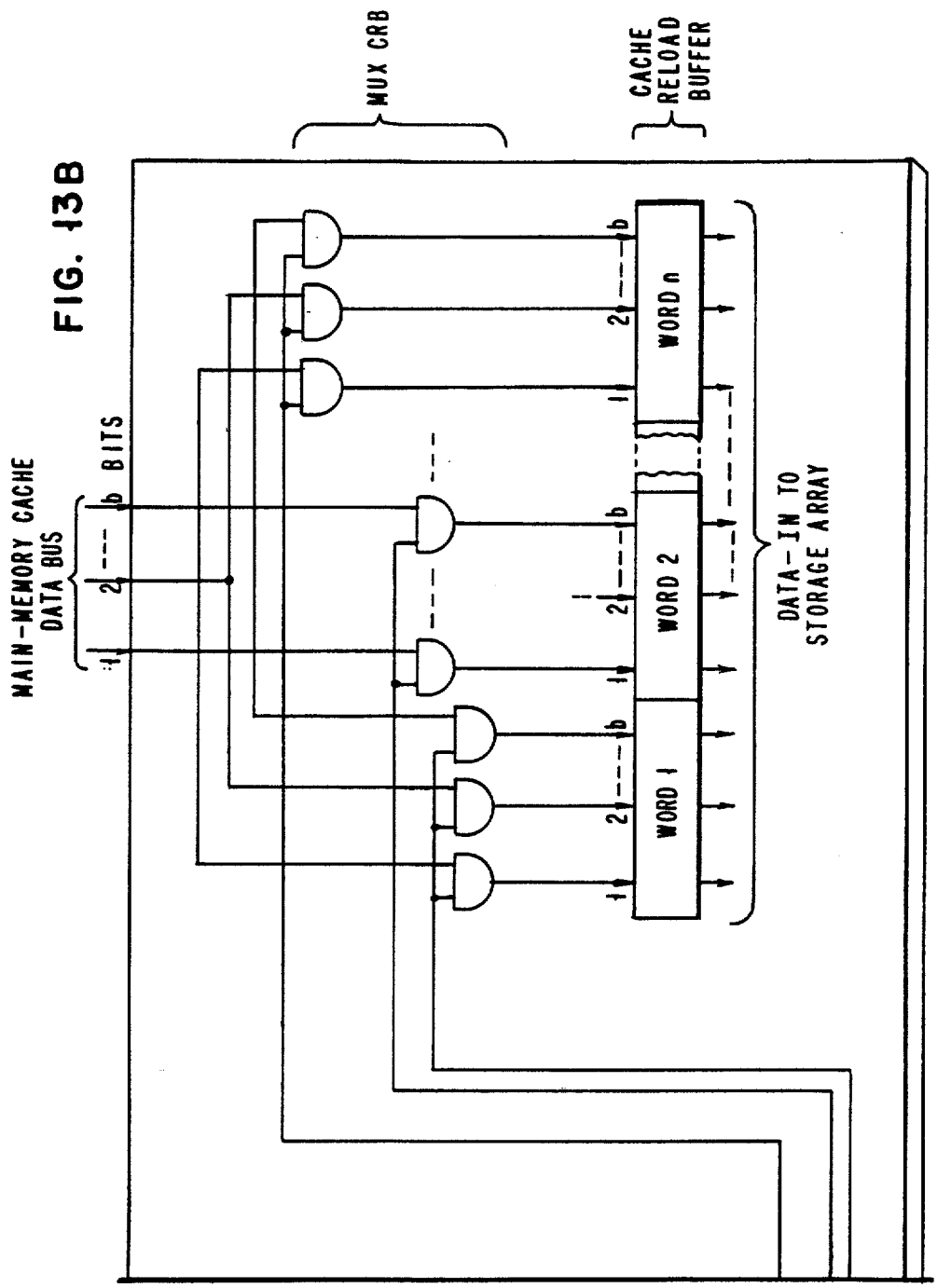

FUNCTIONAL CACHE MEMORY CHIP ARCHITECTURE FOR IMPROVED CACHE ACCESS

FIELD OF THE INVENTION

The present invention relates to computing systems having a memory hierarchy in which one level of the hierarchy is "paged" from the level above it, the term "paged" being used in a general sense wherein a segment or "page" is accessed from a higher level of the hierarchy. The present invention provides ways to significantly improve the overall performance of the memory by the judicious choice of, and manner of incorporating the proper functions on the memory chips. More particularly, the ideas and essential concepts described herein relate to an improved cache chip architecture. However, it will be apparent that the concepts could be used at other appropriate levels of the memory hierarchy.

BACKGROUND OF THE INVENTION

The large performance gap between CPU and main memory has made the use of a cache an important factor for any future high performance processor, either microprocessor, mid-sized or large system. However, a cache is valuable only if the total average time to access the cache is much less than that to access main memory for the same data. This total average time includes the usual access time when data is resident in the cache plus a weighted average time for reload on a cache "miss".

Caches are typically designed from ordinary memory arrays and any other necessary or desired functions are done elsewhere, with complex logic as needed. Since the required functions are usually not well integrated, extra path delays, chip crossings, and additional circuits are required. The present invention teaches how to build cache array chips with simple, well integrated functions which greatly enhance the performance of the overall memory system with minimal amounts of additional hardware. The major improvement provided by this approach is the minimization of average system performance degradation due to a cache "miss" while still providing the means for fast access during a normal read/rewrite cycle.

The general approach taken in the industry to improve cache performance has traditionally been to use ordinary fast RAM chips and interface these close to the processor for speed. However, this is far from the ideal solution. The stringent and often conflicting requirements on the cache bandwidth for servicing the processor and minimizing reload time an severely limit the attainable performance.

There are a number of conflicting requirements which a cache array must fulfill in order to provide the necessary functions with high performance. Achieving these with standard array designs typically leads to a rather complex system. The complexity and resulting high costs can be substantially reduced by understanding the functions which are required and properly integrating these functions into the array chips. In order to understand this, fundamental accessing problems and typical methods of implementation must be considered. To do this a very common type of cache organization will be used as an example, implemented with relatively simple, single port array chips. Then a slightly more complex array chip with still single ported, followed by a similar structure but using a true two-port array (can support two simultaneous accesses to different addresses) will be discussed. This will clearly show the external complexity required to implement the full cache array structure. It will then be shown how various parts of this complexity can be simplified by more judicious design of the cache chip. From this discussion, it will be seen how the present invention is actually an ultimate simplification of the presented approaches which can be used for micro, mini, or large computers. It will be seen that not only is a two-port array not needed, but a two-port array without other function added is inadequate as well as costly and, therefore, a poor design/performance trade off. It is assumed in the following discussion that the path between cache and the CPU is one logical CPU word per cycle. For complex architectures where multiple arguments are fetched simultaneously on the same cycle, a two-port array may be useful, but does not change the design issues with respect to the integrated functions for reload and performance as discussed below.

In order to achieve a low-cost, high-speed cache, designers typically use a late-select, set-associative cache organization. This provides a means of starting several possible logical functions in parallel and then deciding later in the cycle which one is correct. The correct one is then used in subsequent stages of the pipeline.

A late-select cache organized to be addressable as four-way set-associative will first be considered. Referring to FIG. 1, during a normal Read access, part of the virtual address is used to select the four possible words that could be correct, namely, the congruence class which consists of one word from each set A, B, C, D. Simultaneously, the total virtual address is translated via the translation look aside buffer, TLB and cache Directory to see which set, if any, is the correct target of the access. If one is chosen, then "late" in the cycle, the correct word is enabled in one of these sets by an appropriate late-select signal and placed on the CPU-cache data bus.

Typically, the data outports of any chip are implemented with tri-state drivers so the four words can be dot-ORed together. These drivers have a data enable signal so that one can be enabled and only one is ever placed on the CPU-cache data bus. During a write-access, a problem is encountered. Typical high-speed static FET memory chips require that the data be valid at the chip boundary before the chip access is initiated. For a late-select cache design, this presents a problem since it is desired to start the chip access in parallel with the translation so the data cannot possibly be valid until the translation is complete. Typical caches use a read-modify-write operation which requires two cache cycles—one to read, one to modify and write back—which reduce system performance accordingly. Functionally, it is desirable to have a cache which can perform a late-write operation. This is possible to do without impacting the cache performance but requires special design of the chip.

Whenever the translation indicates a cache "miss", the cache block must be fetched from main memory and loaded into the cache. For complex instruction set computers (CISC) which require a relatively large number of processor cycles per instruction executed, there are often enough free cycles to allow this reload process to be relatively slow with a tolerable degradation on system performance. However, the trend in processor design has been to reduce the number of processor cycles per instruction executed and such designs place severe demands on the overall memory sub system bandwidth. For instance, published reports [see FIG. 6 of REF. 2] have shown that for a high performance processor pipeline designed to achieve an average of approximately 1.25 cycles per instruction executed, assuming an ideal memory system (e.g. infinite cache) the reload penalty for a finite cache at a typical design point can be an average of 5 percent reduction in Million Instructions Per Second (MIPS) executed by the processor for each additional cycle of reload. Thus for high-performance systems, this typically requires that the reload take place as quickly as possible. Since the memory access time is generally some fixed value, additional performance is obtained by reloading multiple words on each cycle, once the first main memory access has started.

However, loading multiple words into the cache on a "miss" presents several problems. First, the reload requires that all the words be placed into contiguous logical locations in the "same set" i.e. all the words go to set A, B, C, or D. For instance, suppose N words are reloaded on each cache cycle, as in FIG. 2, then all the N word I/O ports must now be connected somehow to one of the sets. There are some additional complicating requirements, e.g. on a "miss", the reload should start on the word that caused the "miss" so that it can be "loaded-through" to the CPU for processing in parallel with the reload. All of these requirements are very different from the normal access shown in FIG. 1 where one word from "each set" is accessed, on a word boundary. These conflicting accessing requirements create problems in cache design. A number of examples of how these requirements can or have been met starting with simple arrays, progressing to more sophisticated designs will now be set forth.

First assume that a cache array chip is available which allows an array design of one CPU logical word per chip unit, where the chip unit making up the word can be one chip or several chips. The number of chips in the partitioning used to obtain a logical word is a function of the cache size and chip modularity which is not important in this discussion. In the following description, for simplicity, a "chip unit" will be bused to supply one word to or from the CPU; but it should be understood that more than one chip can be implied, and in various configurations as will be well understood by those skilled in the art.

With such a chip unit, it is possible to build a two, four, or more-way set-associative, late-select cache which can also reload multiple words on each cache cycle (e.g. two, four, or more words per cycle). The manner in which this is achieved is a function of the relation of the required overall cache capacity and number of bits per chip that the technology can provide, i.e. the modularity of the chips and system. In order to understand the problems and trade offs, assume that a single port chip unit with a one word I/O port is being considered. Further, assume that the desired total cache capacity and available chip unit density are such that a total of eight chip units are required. If the set associativity is four-way then these eight chip units will map to two chip units per set of the associativity, as shown in FIG. 3. In such a case, it is possible to reload a maximum of two words per reload cycle since each set has two chip units and hence two independent I/O ports available to main memory. On a normal CPU access, the word address bit will access one of the two rows of chip units and one word from each of these four chip units will be accessed and held at the edge of the chip unit, one word for each of the four sets, i.e. the congruence class. The late-select signal will select one of the four, and it will be placed on the CPU data bus via a CPU multiplexer. This multiplexer is obviously necessary since the I/O lines out of each chip cannot be dot-ORed except as shown, even though they are from tri-state drivers. The reason for this is because, for reload, two separate words traverse between main memory and the array, one word for each row. Thus the off-chip multiplexer is necessary.

Of course, one serious drawback is that this structure cannot support a simultaneous reload and a CPU access because of the one-port design of the chip units. This results in access interferences and degradation of performance which can be reduced by a separate interface to main memory for reload. However, another limitation which is not a result of the one-port design is that this configuration cannot support any more than two words of reload per cycle. For instance, if a reload of four words per reload cycle were desirable, such a configuration could not support this, even if the chip units were two-ported arrays with one of the ports used for a separate bus to main memory for reload. This results from the fact that each set A, B, C, or D is contained on only two chip units with one word I/O per chip unit or two words maximum per set for reload. Thus a simple way to increase the reload path width would be to add additional chip units. The use of sixteen chip units with four per set would provide a four-word reload path as desired. However, the cache capacity has been doubled, which increases the cost, package size and delay, and is not typically acceptable.

The fundamental design problem is that technology improvements increase the array bit density per chip faster than the system requirements increase the cache capacity. The net result is that the number of chip units per system has greatly decreased with time, and this trend will probably continue in the industry. Thus the designs of the "next" system typically have fewer chip units available and a potentially smaller reload path. For instance, suppose that for the next generation design of the previously described cache, the chip density is increased by a factor of four while the cache capacity is increased by a factor of two. Hence, only four chip units are required instead of eight, so the organization would only provide a one word reload path which is very undesirable. Obviously, if the I/O path of each chip unit were increased from one to two words, a two-word reload path would be possible. However, this is achieved at considerable expense since only a one-word path to the CPU is desired, thus wasting the most important parameter, namely, cache bandwidth. Other solutions are possible as will be seen below.

In the previously described design, there are a total of eight chip units so that during a reload, there are six potential I/O ports which are sitting idle. These could be used for increasing the reload path width if it were possible to spread the words of each set over each chip unit. Then during reload, one word can be reloaded to each chip unit for a maximum of eight possible words reloaded per cycle in this case. However, this improvement requires a special type of mapping of the logical cache blocks (the replaceable unit) to the physical array structure, sometimes referred to as "Latin Square mapping" [references 3 and 4]. This mapping, using the cache chip unit described previously for a four-way set-associative, late-select cache design would require only four chip units. (Additional groups of four could be added above these with appropriate interfaces). The need for this rather complex mapping arises from the lack of an adequate reload interface coupled with the small number of chip units needed for a typical cache.

Stated generally, "Latin Square mapping" would be utilized in the following manner to achieve multi word cache reload. During normal accesses, the same address is applied to all chip units in order to access the congruence class, composed of the corresponding word from each set, e.g. word one from each set A, B, C, and D. Thus these four words must be at the same address on each chip unit. Likewise with words 2, 3, 4, etc. However, during reload, only one word can be written into each chip unit and it is desired to reload, for example word A0, A1, A2, and A3 on the same cycle. Obviously this can be done only if each of these words is on a different chip unit, as shown schematically in FIG. 4. Likewise with all other groups of four words.

The Latin Square mapping provides the proper distribution of words on the chip units, but two problems are encountered during reload. First, contiguous words of any given block are stored at different address on each chip unit, hence each chip unit must receive a different (partially different) address. Since the starting address will depend on which set is being reloaded, the addressing logic and bus for reload are much more complex. A further complication arises in that a given word from main memory, e.g. word one can reside on any of the chip units, depending on the set being reloaded, hence a ring-shift data aligner is required between the cache and the main memory. Additional complexity is introduced in the late-select logic. Since the words of any set can be on any chip unit, the late-select signal must choose not only the set, but must also match the appropriate word and set according to the Latin Square mapping, in order to enable the correct chip unit. A final complication arises from the single word data path I/O of each chip unit. During normal access, the four words must merge into one word to/from the CPU. On reload, the four words must be separate, allowing one word I/O to each chip unit. For the assumed chip unit described previously, this would require an off-chip multiplexer of some sort. While there are many ways and places for providing this function, it must be somewhere. If this function is placed on a separate chip as in FIG. 4, the extra chip crossing and multiplexer logic delay are added in the most critical access path which is extremely undesirable. Ideally, this multiplexer function should be done on the existing chips and the delay should be overlapped with each other. The functionally integrated chip architecture proposed by the present invention totally eliminates such multiplexer and delay as will be seen subsequently.

The additional circuitry required by this organization for accessing is only one aspect of the total problem. Another problem is that even though the reload bandwidth has been improved, it is still far from ideal. Since there is only one I/O port on each chip, then only one access, either for a normal CPU cycle or for a reload cycle is possible on each system clock. A "miss" and subsequent reload typically starts at the word causing the "miss"—this word is immediately loaded—through to the CPU and the CPU resumes processing. If the next CPU cycle requires a cache access, either the CPU or the reloading must wait, with appropriate logic controls for sensing and restarting. Regardless of which alternative is chosen, either CPU or reload-wait, the overall system performance is degraded. Further degradation is encountered from the same access interference problem if a store-in cache is used. The latter means that the cache contains the latest copy of the correct data so that if any changes have been made to a block, it must first be written back to main memory before it can be removed from the cache. With high performance systems, a store-in cache is a better cost performance design hence this produces many more opportunities for access interference and degradation. There are a number of ways in which the Latin Squares mapped chip may be improved. The first involves simple additions to the cache chip.

In order to minimize critical path electrical delays as well as simplify the overall busing, a few simple functions can be added to the cache chips without disturbing the array design, i.e., the functions are added entirely on the periphery of the array boundary so that the one-port array structure remains intact. The external boundary of the chip unit is assumed to have a separate one-word bus to the CPU and another one-word bus to the main memory, but there is only one path into the internal array. This is achieved by placing the multiplexer function (MUX boxes in FIG. 4) on the chip unit. Additional improvements are obtained by also including the "load-through" path, all of which help remove some of the limitations of the above organization. Since the storage array itself is still only a one-port design, this will minimize cost and maximize bit density. The small amount of multiplexing necessary to achieve this may be included on-chip without much difficulty. The functional structure of such a chip unit is illustrated in FIG. 5 (ignore the Store Back Buffer for this discussion). It should be noted that the ring shift aligner described above required for providing the proper addresses to the chips is not on the chip but is part of the main memory interface. In addition, if a Load-Thru Buffer is also added as shown in FIG. 5, additional improvement can be attained in some limited cases. For instance, if a "read" access to word A0 causes a "miss" and each chip has a Load-Thru Buffer, then the four words A0, A1, A2, and A3 are loaded both into the array and the buffer. Thus these words are available from these buffers on subsequent cycles. Note that since four words are reloaded each cycle, only the first group of four would be loaded into the Load-Thru Buffers, the subsequent reloading words go only to the array. If sufficient logic is included to identify these first four words, any of them could be loaded-through to the CPU via the load-through path as needed. On the next cycle after loading-through word A0 if the CPU accesses word A1, A2, or A3, it can be fetched from the load-through buffer on the appropriate chip, without interfering with the reload of the second group of four words from main memory into the cache. Of course, if the CPU writes to any of these words, or if the access is to a word other than one of any of the Load-Thru Buffers, then an interference is encountered. Such Load-Thru Buffers can be valuable for instruction fetches, which tend to be sequential; since data fetches tend to be more random, the Load-Thru Buffer will be of some, but limited value. Even for sequential instruction fetches, the Load-Thru Buffer does not necessarily eliminate interference between reloading and the CPU accesses. For instance, suppose the word causing the "miss" was A3. A subsequent reload will put A0, A1, A2, and A3 into the Load- Thru Buffer. A sequential instruction fetch will next access A4 which is not in any Load-Thru Buffer and must wait for the next reload cycle and access to the array itself. The next instruction fetch toward A5 will not have this word in the Load-Thru Buffer, hence an interference. Of course, complex logic could be used to latch the second set of four reloading words into the Load-Thru Buffers in this case, but the cost is high and the reward is small. The functionally integrated cache of the present invention is a significantly better design, as will be seen. In all cases, if access is permitted to partially loaded blocks, this will require word-valid flags in logic in the CPU to know which words are accessible.

It can be seen from the above discussions that the interface between cache and main memory is quite different from that between cache and CPU. Since these two interfaces are best satisfied with two buses operating with different addresses, it would seem appropriate to use an array which is truly two-ported allowing two simultaneous random accesses to the array. While this is possible, we will see that this provides more than what is required for some of the problems, and not enough to solve all the problems, in other words it is not the ideal solution in so far as cost for improved performance is concerned.

The cache organized using a two-port chip with one port interfaced main memory for reload, the other interfaced to the CPU for normal accesses, as shown in FIG. 6, will now be considered. For reload, a separate ring shift-data aligner and shift logic, plus a separate address bus per chip unit with address logic are still required much as before. Since each I/O port has a separate address input, the CPU address can be separate, with one bus to all chip units. The two ports eliminate the need for separate multiplexers on the data bus, they are built into the additional complexity of the cells and separate word/bit lines and decoders. The Load-Thru Buffers are no longer needed since once a word has been loaded, random access is available via the CPU port, if logic is retained in the CPU for specifying which words have been reloaded. However, the load-through path may still be needed, even though a two-ported array is used. The reason is that a two-port cell design is considerably simpler if a write and simultaneous read are not permitted to the same cell, i.e., do not read and write to the same word simultaneously. If this is the case, then either a separate load-through path is required, or an extra cycle of delay is encountered before the CPU can restart. In addition, the logic for comparing the addresses for the two ports and granting access must be done in the CPU; the cache is a slave and will produce errors if used improperly. The store-back of modified blocks which added to the reload time as described previously is no different for the two-port organization. Consider the fact that a two-port cell/array design itself, without including the additional drivers, decoders, and other logic which is necessary, consumes approximately thirty to fifty percent more area than a one port design and will be slower, then an enormous price is paid and very little is gained in return. Thus this type of two-port cache design is definitely not a good choice.

It is clear from the above discussion that all of the currently known cache architectures which attempted to solve various cache delay/interference problems suffer in a number of respects as outlined above. What is provided by the present invention is an improved cache architecture wherein significant functional capability can be mounted directly on chip with the cache storage units without significantly interfering with the storage cell design itself. Such a design should have significantly improved reload capabilities as well as improved store-back capabilities.

LIST OF REFERENCES

1. Matick, R. Computer Storage Systems and Technology, John Wiley and Sons, N.Y., 1977.
2. Matick R. E., and D. T. Ling, Architecture implications in the design of microprocessors, IBM Systems Journal, Vol. 23, No. 3, 1984, pp. 264–280 (FIG. 6).
3. Mann H. B., Analysis and Design of Experiments, Dover Publications N.Y., 1949.
4. Hsiao, M. Y., D. Bossen, and R. T. Chien, Orthogonal Latin Square Codes, IBM Jor. Research and Development, July 1970, pp. 390–394.
5. Schuster, S., et al., A 15-ns CMOS 64K RAM, IEEE Journal of Solid State Circuits, Vol. SC-21, No. 5, Oct. 1986, pp. 704–711.
6. Fier, D. et al., A 36/72b CMOS Micro-Mainframe Chip Set, IEEE International Solid State Circuits Conference, Feb. 1986, Digest of Technical Papers, p. 26
7. Alper, D., D. Carberry M. Yamamura, Y. Chow, P. Mak, 32 Bit Processor Chip Integrates Major System Functions, ELECTRONICS, July 14, 1983, pp. 113–119
8. Watanabe, T., An 8K byte Intelligent Cache Memory, IEEE International Solid State Circuits Conference, Feb. 1987, Digest of Technical Papers, p. 266
9. Alsing, C., et al., Minicomputer Fills Mainframe's Shoes, ELECTRONICS, May 22, 1980, pp. 130–137.
10. Mattson, R. Gecsei, Slutz, and Traiger, "Evaluation Technique for Storage Hierarchy" IBM Systems Journal, Vol. 9, No. 2, 1970, p. 78.

PRIOR ART

The extensive list of references above constitutes the closest relevant prior art known to the inventors. The specific relevancy of these references is set forth in the Background of the Invention section and need not be elaborated on further. It is specifically to be noted that although certain of the references suggest placing certain cache functions directly on chip with the cache storage cells, none suggest the functional capabilities of the present invention.

SUMMARY AND OBJECTS

It is a primary object of the present invention to provide a functional cache chip architecture which substantially improves overall cache access time.

It is another object of the invention to provide such an architecture having a performance substantially better than much more complicated e.g., two-port architectures.

It is a further object to provide such an architecture which utilizes existing cache chip arrays with add on-chip functions mounted on the periphery of said chips.

It is yet another object of the invention to provide such an architecture which significantly increases the "effective bandwidth" of the cache.

It is yet another object to provide such a cache architecture which substantially improves the cache reload function.

It is yet another object to provide such a cache architecture which substantially improves the store/back function from cache to main memory.

It is yet another object to provide such a cache architecture which provides a "late" write/enable function whereby both read and write operations can occur within the cache in the same memory cycle allowing time for any necessary address translation.

It has been found, in accordance with the teachings of the present invention, that the cache need not be the performance limiting factor of the system if a properly integrated functional cache chip is used. The major functional improvements provided by the invention fall into two broad categories. First is a normal read/write function which provides a chip architecture and organization which allows the chip to be used in a fast, "late select" organization or serial access mode, both of which may be provided with any degree of set-associativity and achieve an effective one-cycle write operation. The second function relates to cache reload (due to an access "miss") which provides several subordinate functions well integrated into a static RAM chip which substantially reduce the reload time, particularly for a store-in cache organization.

The resultant cache chip organization permits a "late select" cache to be designed and provides a relatively simple way for achieving a nearly transparent, multiple word reload by incorporating a Cache-Reload Buffer, a store-back buffer, and a load-through function on the cache array chips for reloading, and a delayed write-enable for achieving an effective one-cycle write operation. In addition, two separate decoders are provided, one for cache access and one for cache reload which efficiently provide for the different addressing or accessing modes required of access or reload.

BRIEF DESCRIPTION OF THE DRAWINGS

FIG. 7 comprises an organizational drawing for FIGS. 7A through 7C.

FIGS. 7A through 7C illustrate address specifications and generation for a typical cache subsystem.

FIG. 13 comprises a functional schematic diagram of one chip Cache-Reload Buffer controls for the organization of FIG. 11 providing simultaneous reloading and access to a different block in the cache.

DESCRIPTION OF THE PREFERRED EMBODIMENT

Figure 1:
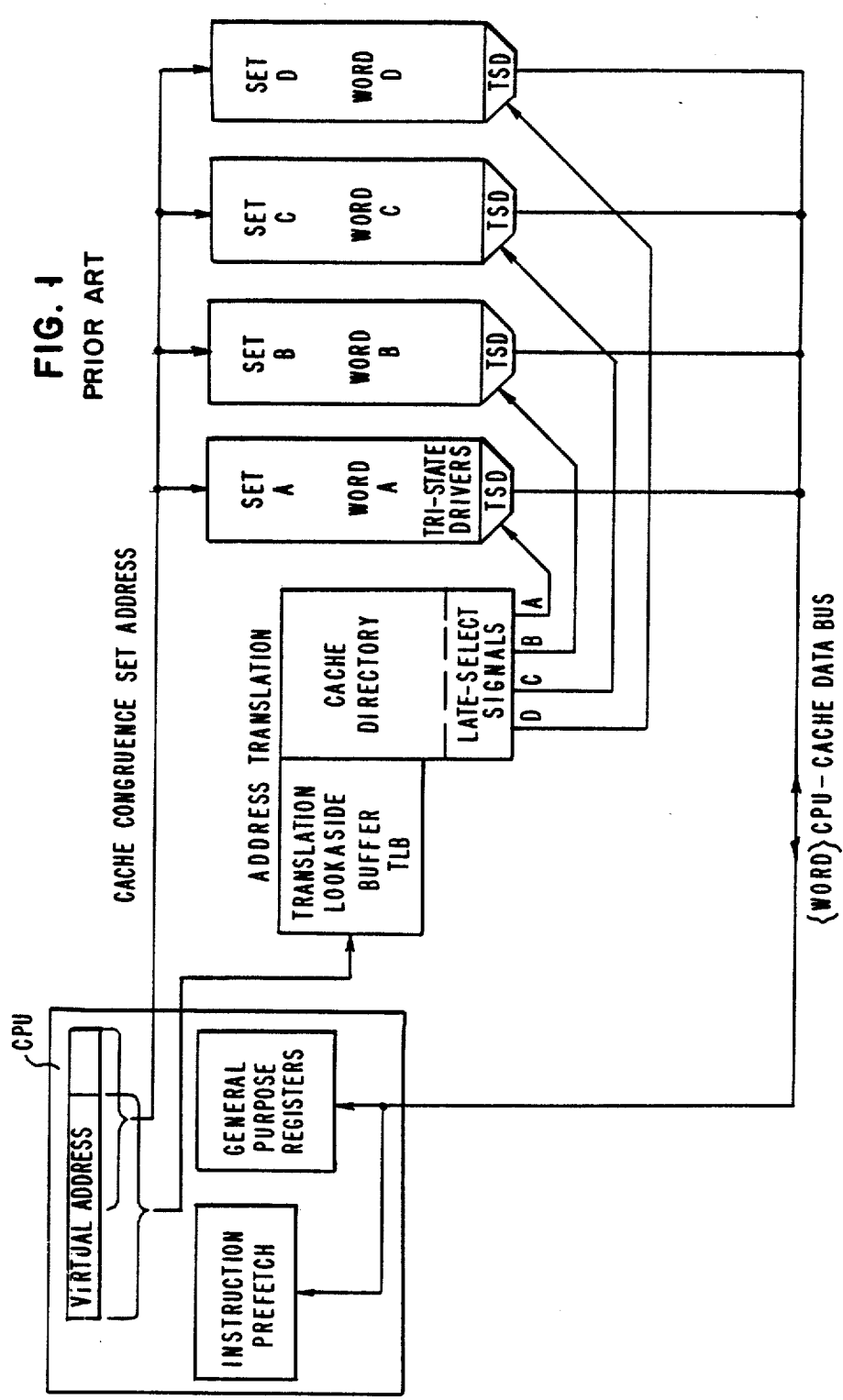
FIG. 1 comprises a combination high level data flow and functional block diagram showing address and data flow paths between a CPU and a late-select four-way set-associative cache memory.
Figure 2:
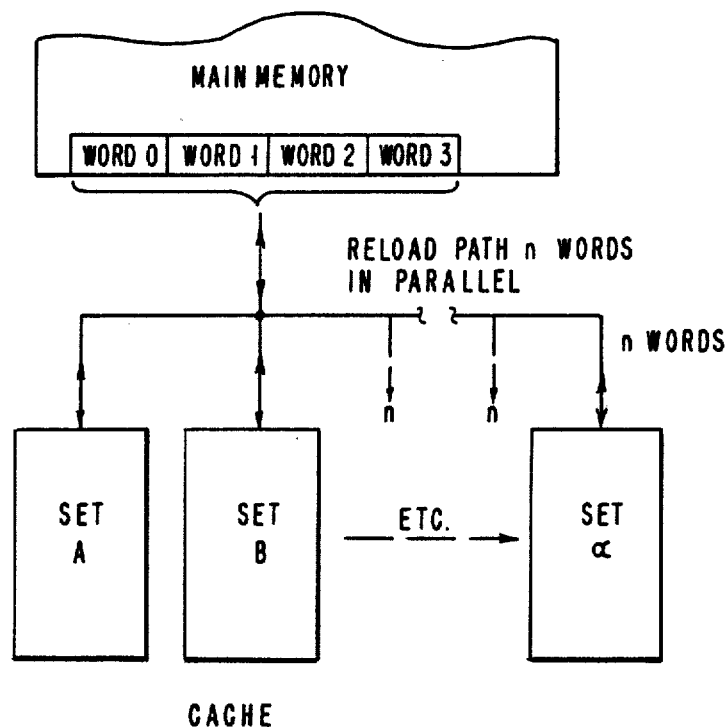
FIG. 2 comprises a combination high level data flow and functional block diagram illustrating the main memory-cache data path for the reloading of N words (in cache) each cycle, wherein all N words are stored in the same (out of $\alpha$) set.

According to the teachings of the present invention, a number of key functions are placed on the cache array chips to minimize the I/O pin count while providing overall performance optimization. These special functions include a Cache-Reload Buffer (CRB) a Store-Back Buffer, (SBB) a Load-Thru Buffer (LTB) and a Delayed Write-Enable function.

A Cache-Reload Buffer is used to allow the CPU to have access to the cache simultaneously with reloading, and can be useful for a large number of different access sequences. For example, in a typical, single cache system (combined instructions and data) which uses load-thru, whenever a cache "miss" occurs, the sequence of cache accesses during reload can take several possible paths, as follows:

PATH 1: Suppose the cache "miss" is to an instruction and 4 words are loaded-thru during the initial part of the reload process. The instruction which caused the "miss" is decoded immediately before reload is completed. This instruction can be a register operation with no cache access, or can access the cache for either a load, store, or branch. If it is a load or store, the probability is very high (nearly 100%) that this cache reference is to some other block (data block) and not the current one being reloaded. If the reference is a branch, then it has a high probability of being in the same block since branch targets on average are roughly 6 bytes away although many are much longer. So some branches will be to the same block and some to different blocks of the working set. The proportion between same vs different blocks referenced will dynamically vary widely since the point of entry into the block which caused the first "miss" can be anywhere, even the last instruction of the block. This would be the case, for instance, if it was the target of a previous branch and the block boundaries just happen to fall here.

Of course, the first loaded-thru instruction could be a register to register op with no cache reference. Then the second, third etc. and all loaded-thru instructions could follow the above path of not accessing cache, or accessing the same or a different block. In any case, if the originally loaded-thru instructions are all executed before the original "miss" is reloaded, or alternatively, only one instruction is loaded-thru and no branch-out occurs, then an access to the reloading block will be necessary to get the next instruction.

PATH (2): Suppose the original cache "miss" is to data i.e. a load or store. Only the missed word can be loaded-thru because there is no destination in the CPU for other data words, but this is of little consequence for subsequent cache block addresses being the same or different from the missed block address. The CPU will have been executing instructions from some Instruction block already resident in cache when the Load/Store "miss" occurred. Any subsequent access to the cache can be to; data in the same reloading data block; a different data block; the same instruction block being executed; a different instruction block due to branch or block boundary crossing.

The above paths both indicate that for typical cases, whenever a cache "miss" and reload is in progress, and load through is used to resume execution as quickly as possible, there is a high probability that subsequent accesses to both the same as well as different cache blocks will be required before the reload is completed. Thus if it is desired to make the reload process appear to be very fast and transparent, then while a reload is in progress, it is desirable to be able to simultaneously reference a block in cache which is different from the one being reloaded, and also to be able to reference the same one being reloaded, at any arbitrary word boundary. The percentage of references to same vs. different blocks will vary widely on a dynamic basis so it would be desirable to allow for either case, in order to obtain maximum performance.

The Store Back Buffer is a temporary buffer which is particularly useful with a Store-In cache, and is used to speed up replacement of a cache block which has been modified. Whenever a cache "miss" occurs and the block to be removed is one which has been modified, this block must be written back to main memory since it is the only valid copy (Store-in cache). Approximately 30% of the cache blocks will have been modified. If the CPU is required to wait until the old block is written back and then the new block is reloaded, a substantial time delay is incurred. This is improved by writing the modified, old block into the store-back buffer during the interval that the main memory is being accessed for the new block, then waiting until the new block is reloaded before writing back to main memory. This requires a specially designed, well integrated SBB which is interfaced to the storage array, but capable of being isolated and unloaded independently.

The Load-Thru Function is a further improvement to speed up the reload process. The word which caused the cache "miss" is accessed first and passed to the cache chip along with other words when multiple-word reload is used. The cache chip will select and pass the word causing the "miss" on a separate internal path, directly to the CPU data bus to allow processing to continue. If a Cache Reload Buffer is NOT included, then subsequent words may also be loaded through to the processor for the same reason. However, in the preferred embodiment of the invention, multiple words will be reloaded from main memory to the cache on each cycle, while only one word is loaded through to the CPU. Thus in addition to a Load-Thru path, some additional temporary buffer will be required to hold the extra words for "loading through" on subsequent machine cycles. In the preferred embodiment, a Cache Reload Buffer is included which becomes a more general type of Load-Thru Buffer, but the separate Load-Thru path and control are still required.

The Delayed Write Enable function allows one to achieve a one-cycle write operation which matches the one-cycle read operation, for a late-select cache. This is especially desirable for cases where an existing static cache chip is available and one wishes to just add the required functions around the periphery of the chip without redesigning the arrays or existing circuitry.

CACHE ARRAY MAPPING

In order to achieve high speed, a late-select cache of the type described above with reference to FIG. 1 is commonly used. However, attempts to reduce the effective cache reload time on a "miss" typically result in complex addressing and multiplexing functions as well as other problems. Some improvement can be obtained by the use of Latin Square mapping as shown above. However, it still requires substantial logical as well as hardware complexity, introduces additional chip crossing path delays, and thus is not the ideal organization for high performance.

Figure 3:
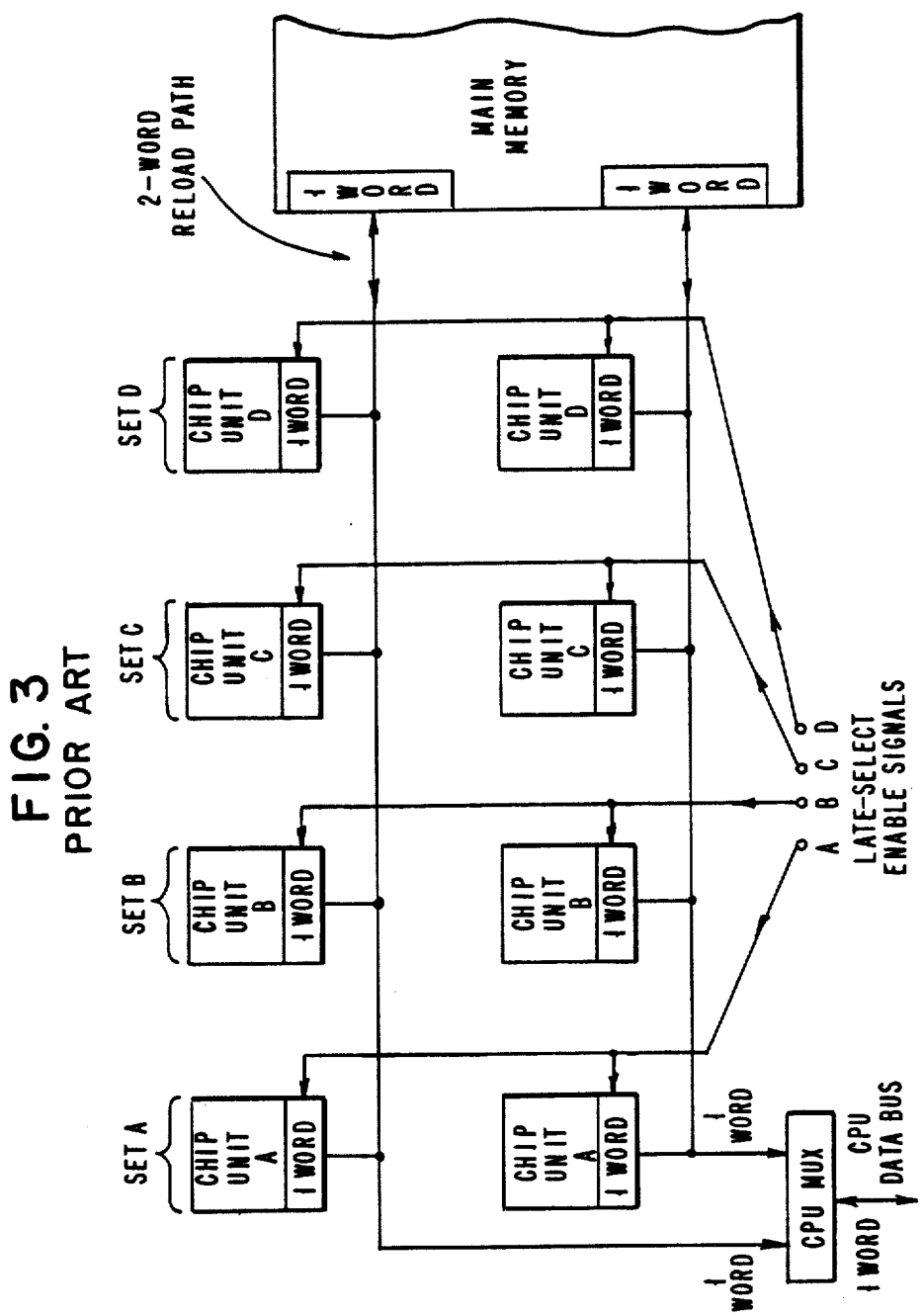
FIG. 3 comprises a combination high level data flow and functional block diagram illustrating the main memory-cache data path for a late-select four-way set-associative cache organized using single port chip units with a two-word reload path requiring two chip units per set.

In order to minimize critical reload path delays and achieve the most highly integrated functionality, the cache arrays must be mapped in a special way. By introducing a suitable modification to the logical to physical mapping of FIG. 4, and appropriate peripheral circuitry on the cache chip, an ideally integrated system can be obtained which is suitable for a late-select organization and multiple word reload, without the complexity and delays of the Latin Square mapping. This mapping will be shown and described later in conjunction with its use. First, the simple, ordinary RAM chip of FIG. 5 which required the Latin Square mapping of FIG. 4 will be revisited, and functions will be added to the chip in several arbitrary steps. The final version (FIG. 14) which is the preferred embodiment of the invention uses the new mapping and all the previously indicated functions to yield the functionally integrated chip. It will be clear that each of these functions is independent of the others and can be used alone, or in combination with the others. It will also be seen that all the desirable functions added to the chip do not require the new mapping, and in fact can be used with the "Latin Squares" mapping of FIG. 3, but then require the off-chip shifting and addressing capability. Nevertheless, it is possible to start with cache systems as used today and add the integrated functionality in a piecemeal fashion if desired.

CASE I: Typical Static Array with the addition of a Store-Back Buffer, a Load-Thru Buffer, and Delayed-Write Enable.

Figure 4:
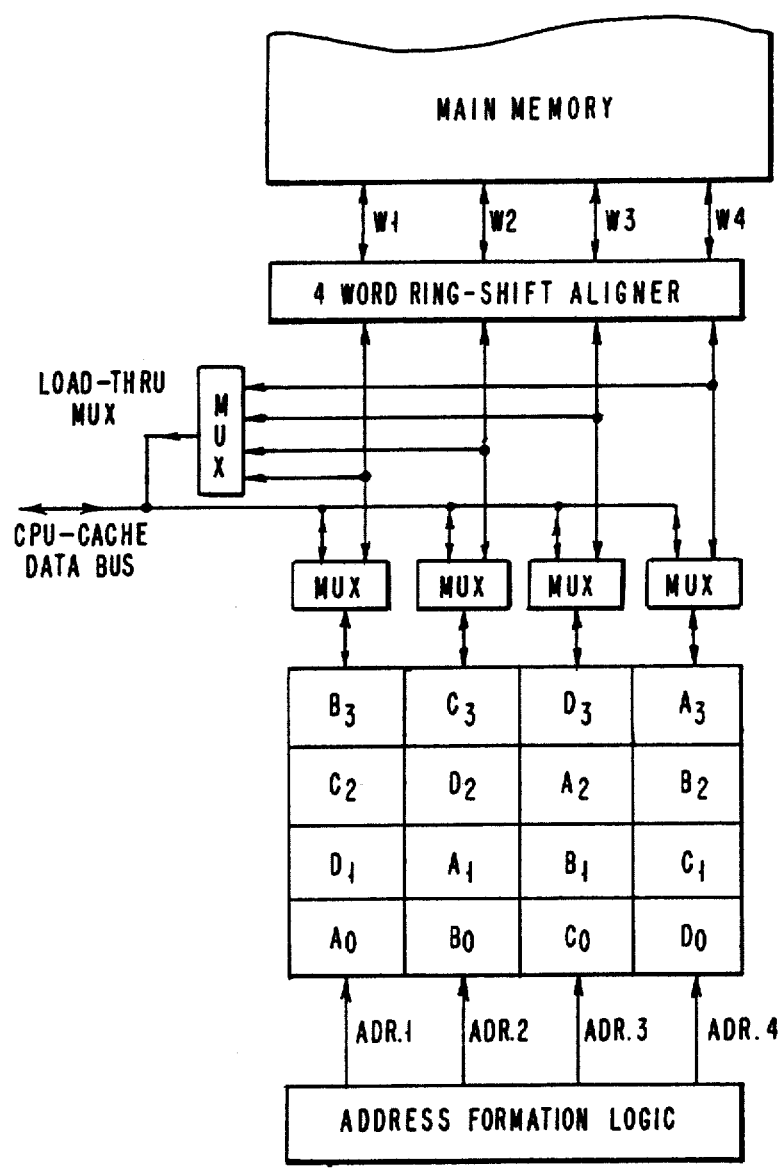
FIG. 4 comprises a combination high level data flow and functional block diagram illustrating the main memory/CPU-cache data path for a four-way set-associative cache illustrating the use of "Latin Square" mapping to achieve an improved cache reload function via a four word main memory-cache data path.
Figure 5:
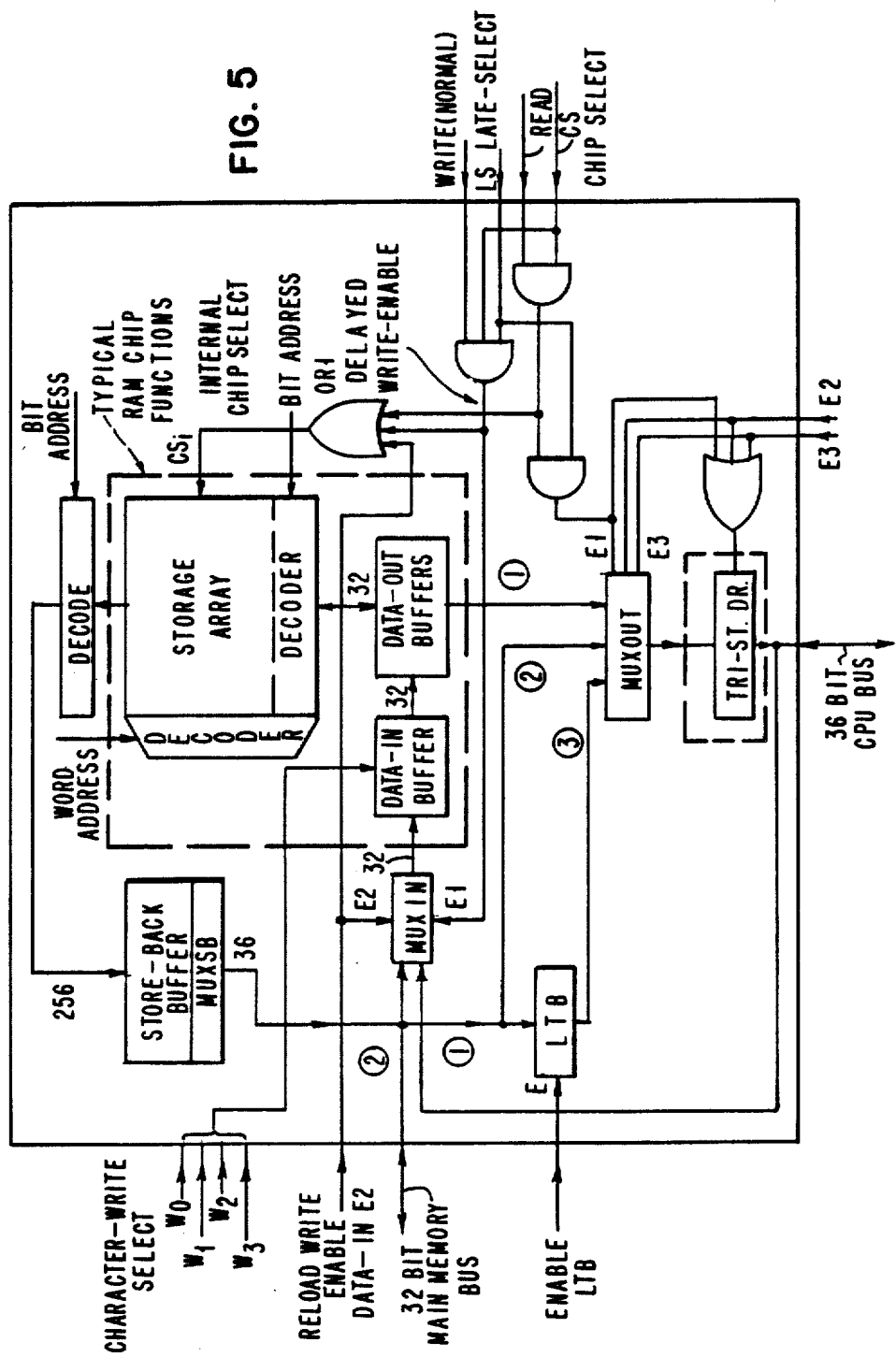
FIG. 5 comprises a high level functional block diagram showing data flow for a modified static RAM chip constructed in accordance with the teachings of the present invention for cache applications, having no reload-shift capability and no Cache-Reload Buffer.
Figure 6:
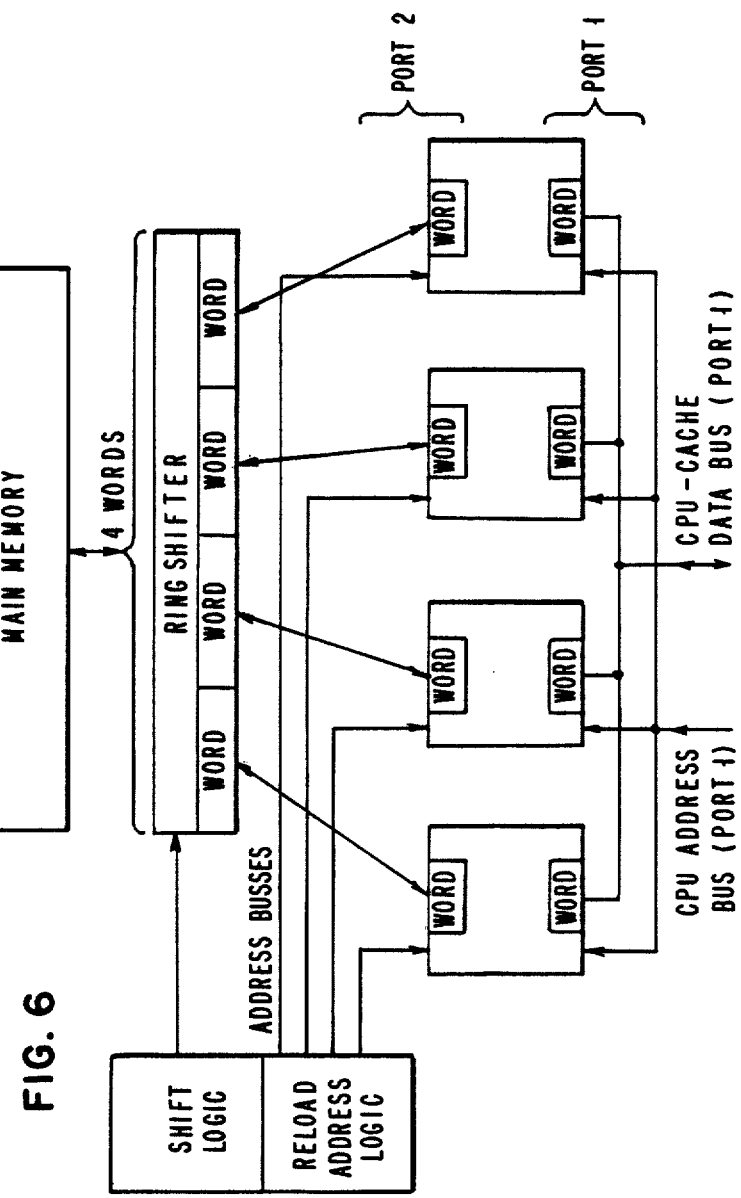
FIG. 6 comprises a combination high level data flow and functional block diagram illustrating the main memory-cache data path for a late-select four-way set-associative cache using true two-part cache arrays with single word/chip unit access on each port, and four-word reload access via "Latin Square" mapping.

FIG. 5 shows a schematic of a typical cache chip which is organized to use the Latin Square mapping shown in FIG. 4, with the addition of a Store Back Buffer and a Load Thru Buffer. This mapping requires that the Reload-shift function of FIG. 4 be done off-chip and is not shown.

Figure 7A:
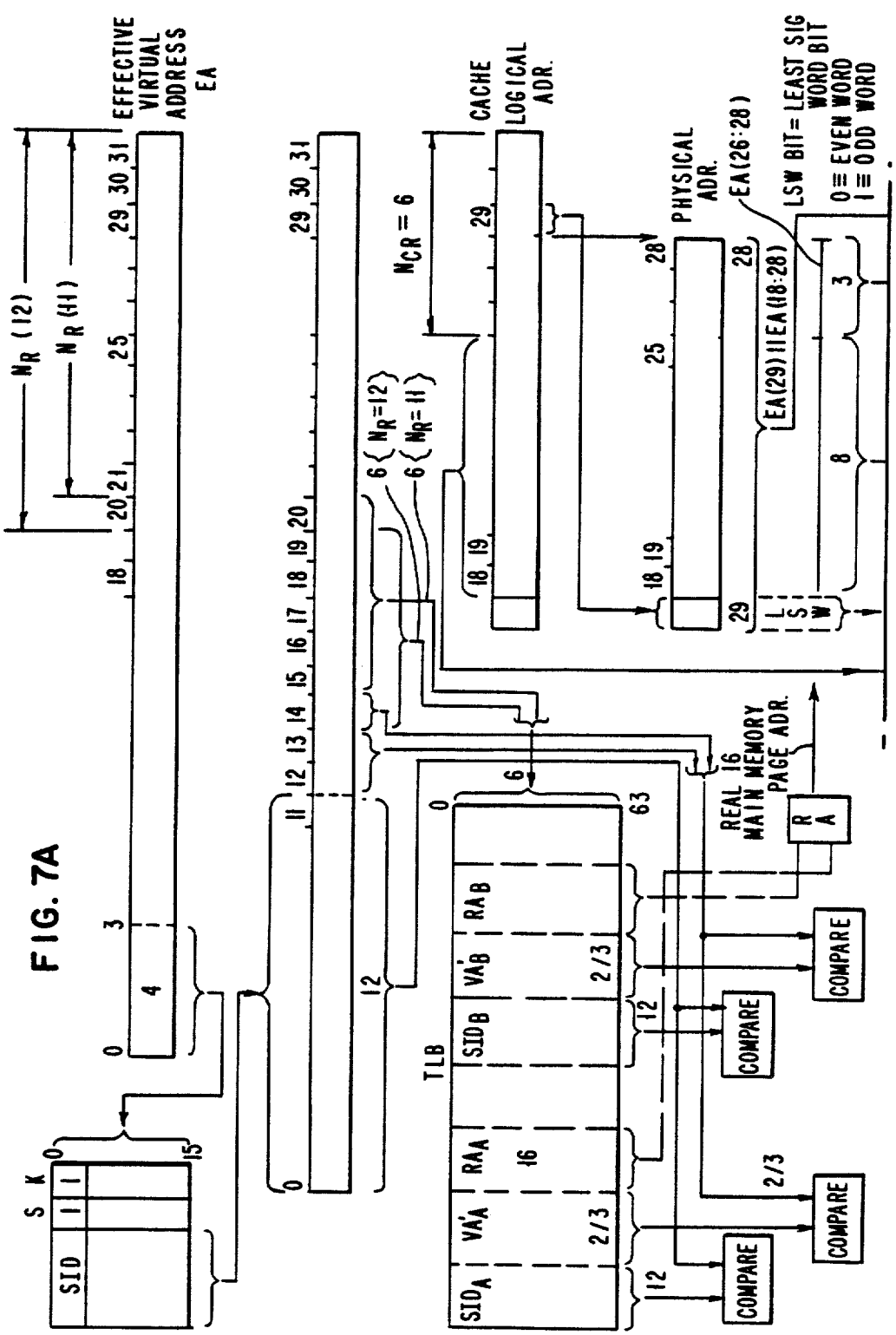
Figure 14:
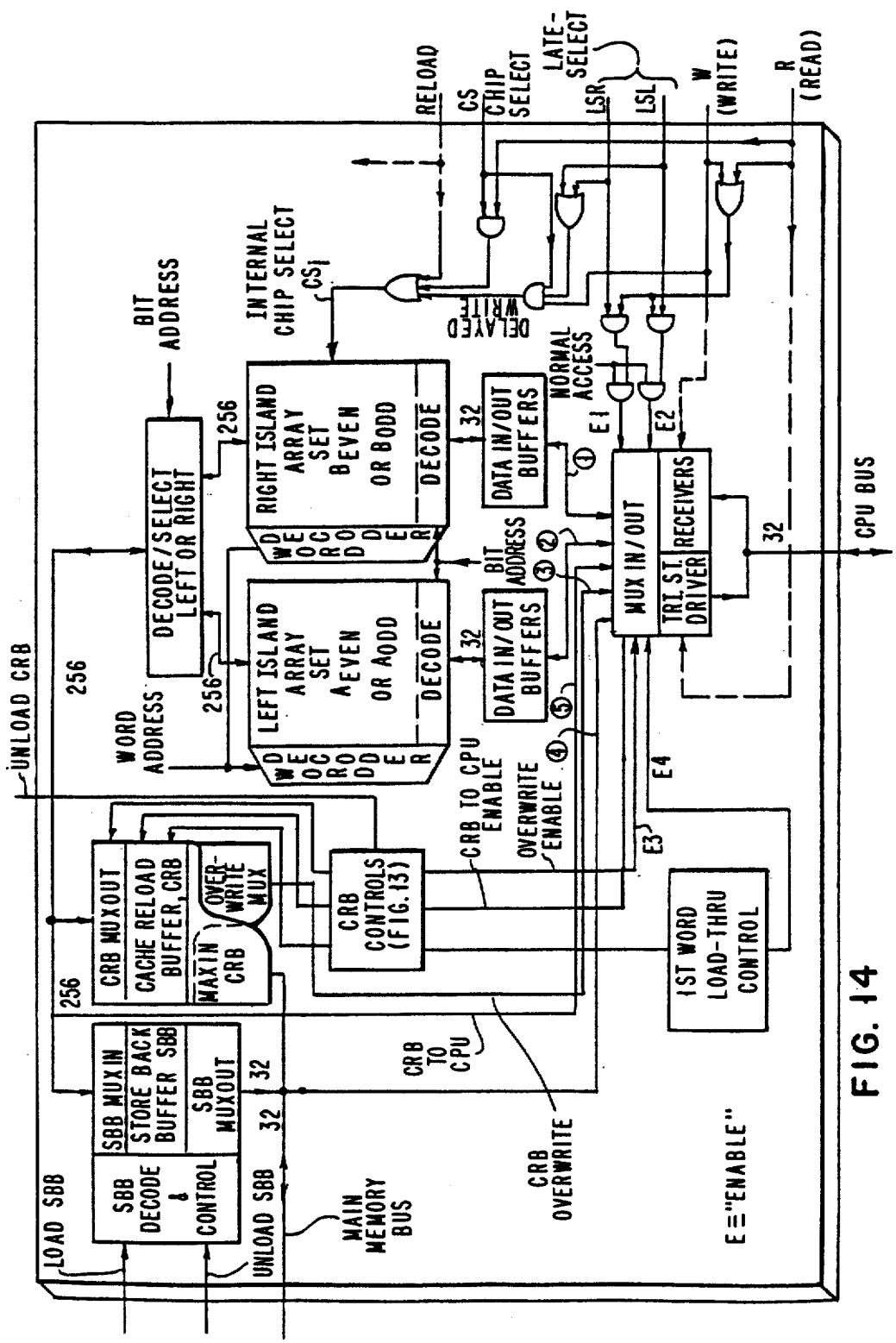
FIG. 14 A preferred embodiment of the invention comprises a functional block diagram similar to FIGS. 5, 8 and 12 illustrating the organization and architecture of a one chip cache using modified mapping for on-chip reload, a store-back buffer and a fully functional Cache-Reload Buffer.

The address specifications for this case, which will allow both the normal accessing, and double word reload for a "late-select" cache organization with the logical to physical mapping of FIG. 4, is shown in FIG. 7. Also shown are the address specifications for accessing the translation mechanisms (TLB and cache Directory), and the Load-Thru Buffer. The unloading of the Store-Back Array will be done in a very straight forward manner, and completely independent of the cache array accessing. It should be noted in connection with the rather complex addressing scheme of FIGS. 7A-7C, that the final preferred embodiment of the invention as shown in FIG. 14 is greatly simplified. It does not have to detect and develop control signals based on even-/odd addresses and further the complex circuitry otherwise required for reloading, shifting, etc. is eliminated. This will be apparent from the subsequent description.

The organization of FIG. 5 can start with a standard static RAM array as a basis (e.g. Schuster S., et al., "A 15 ns CMOS 64K RAM. A typical static array would contain the functions shown within the large dashed outline. All other required functions can essentially be added in the periphery of the chip, with little or no change to the basic RAM array structure. This is very desirable and cost-effective since the entire chip does not have to be designed or redesigned. The added functions are: a late-select enable on the tri-state drivers; a store-back buffer with associated decoding, if required (decoding may or may not be required, depending on the array structure); a Load-Thru Buffer; two multiplexers, MUXIN and MUXOUT, or some other gating arrangement having equivalent functions; and a Delayed Write-Enable function. The Store Back Buffer function can be obtained by strapping the existing bit/-sense lines across any existing circuitry to the periphery of the array. There, the additional sense amplifiers, latches and, if necessary, any decoding can be done. The actual Store Back buffer can be a multi-bit register, located away from the storage array area.

The Load-Thru Buffer is simply a 32-bit master/slave register with an input enable signal. The two multiplexers can be standard types of AND-OR selection gates with input selection signals for one of two (MUXIN), or one of three inputs (MUXOUT) as shown.

The Delayed Write-Enable provides a one-cycle write function and is needed for the following reason. Typical static FET RAM's use pre-charged sensing circuits for higher speed. Once a memory cycle is started, it must go to completion, followed by pre-charging in preparation for the next cycle. Hence, one must know at the beginning of the "chip-select" enable pulse whether or not a "write" is to be performed. It is not usually possible to access (read) the array and subsequently drive the correct word into the array at the end of the cycle, since the data-in drivers will not be able to switch the state of the cell. However, for a one-cycle, two-way set-associative, late-select cache performing a normal Read operation, it is very desirable to read the two possible words, one from each set, at the beginning of the translation cycle. For a normal Write operation, it is desirable to drive the data into the correct word near the end of the cycle when the late-select signal indicates which of the two sets, A or B, is correct.

This "delayed-write" function can be achieved as follows. Whenever a "write" is to be performed, as indicated by signal W going valid, the actual internal chip-select signal, CS; to the array (which controls activation of the data-in buffer) is delayed until the late select signal becomes valid (note; El to MUXIN need not be delayed e.g. don't care). All address and data lines will have long since been valid at the pins (driving these valid can also be delayed, or staggered, both of which will reduce the "delta I" noise resulting from excessive simultaneous switching of I/O pins). Thus the only time required for completion of this function is that required to drive the data into the array. For such static RAM's, writing is faster than reading, and there is also substantial time available for writing which is the time it would take a normal read operation to gate the data off the chip to the CPU, ring-shift and latch in a register file. This latter is typically much longer than the time needed to drive data into the array, hence the delayed-write is an attractive approach. In some large systems where time may be tight, one could consider overlapping word decoding with the translation time, and enable the word line drivers with the internal chip-select signal. However, this requires some modification to the normal decoding-word driving circuitry, but is possible, if desired.

An alternative way to achieve a late-write function is to redesign the input data buffers to be static circuits so that even though the n-words have been read and sensed, any one of them, as selected late in the cycle by the late-select signal, can be overdriven and change the state of the memory array cells. Having identified the proper functions and necessary sequence of events, any number of such circuits are possible by those skilled in the art, depending on the details of the total chip design and clocking.

For a static RAM fabricated from CMOS technology, the above "delayed write" function can be circumvented, but requires substantial redesign of the bit/sense line circuitry, which is undesirable. Purely static (not using pre-charged) data-in buffers can be used which have more than sufficient capability to overdrive the bit/sense lines to switch the state of the cell. Hence, a late write after a read can be obtained directly. For such a case the late-select signal, instead of going to the delayed-write enable circuit, would be used directly as an enable on MUXIN or Data-in buffer, as appropriate, whenever a Write cycle is specified by signal W.

The other enable signals on both multiplexers (MUXIN and MAXOUT) and the tri-state drivers are also shown. Whenever any data is gated through MUXOUT, the tri-state drivers must be enabled. Thus enable signals E1, E2, and E3 to MUXOUT are ORed together as an enable to these drivers.

Whenever data is being reloaded into the cache from main memory, the enable signals Enable Data-In 2 on MUXIN, as well as Enable LTB on the Load-Thru Buffer, and E2, E3 (at different times) on MUXOUT will be supplied externally to the chip. The former, namely E2 on MUXIN, also becomes the internal chip select via OR1 on a reload-write cycle.

ON-CHIP RELOAD SHIFT

Figure 8:
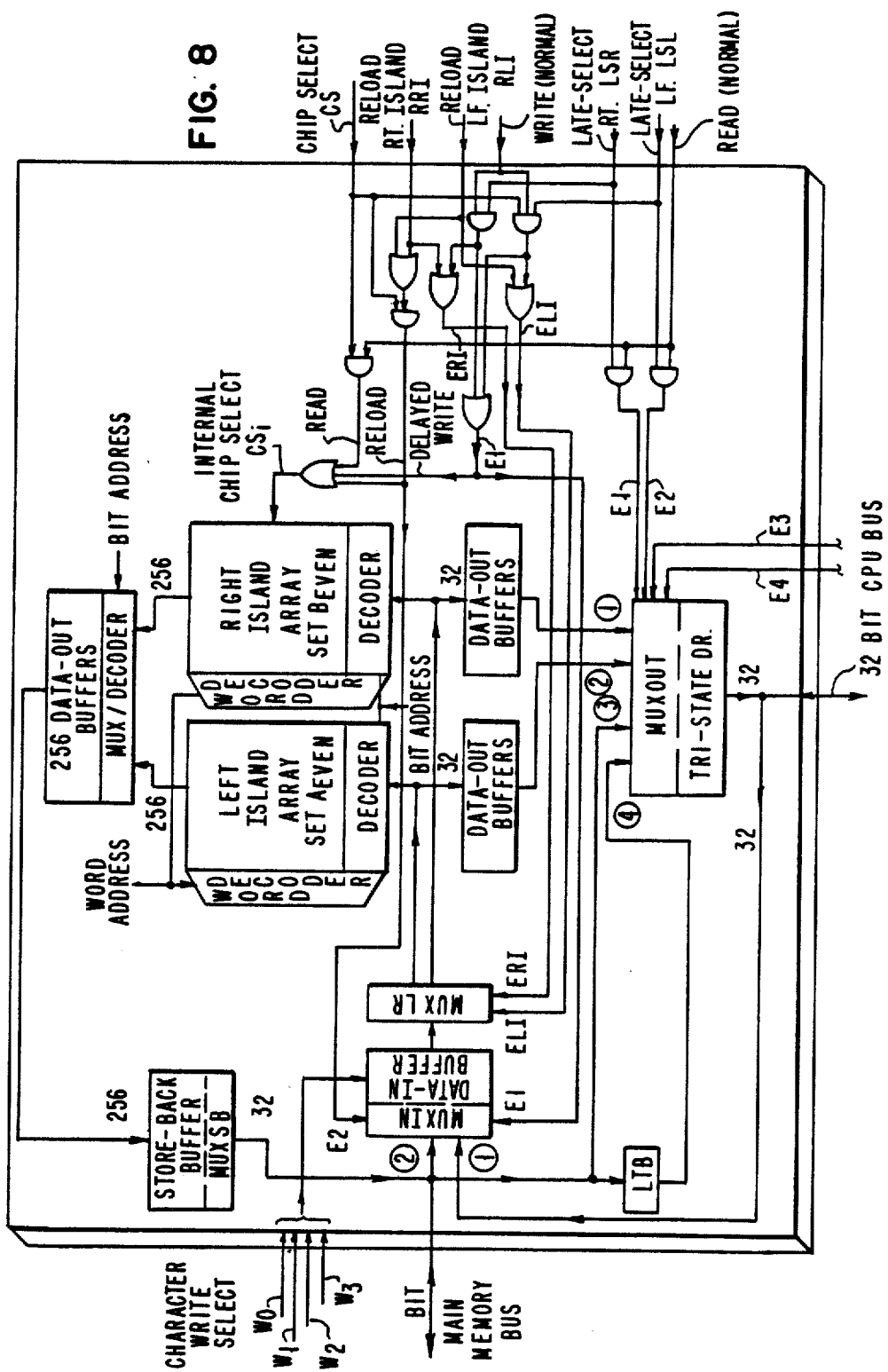
FIG. 8 comprises a high level functional block diagram similar to FIG. 5 illustrating a cache chip constructed in accordance with the teachings of the present invention having on-chip reload-shift capabilities and left/right island reload signals as well as late-select left-right signals provided externally on separate pins.
Figure 9:
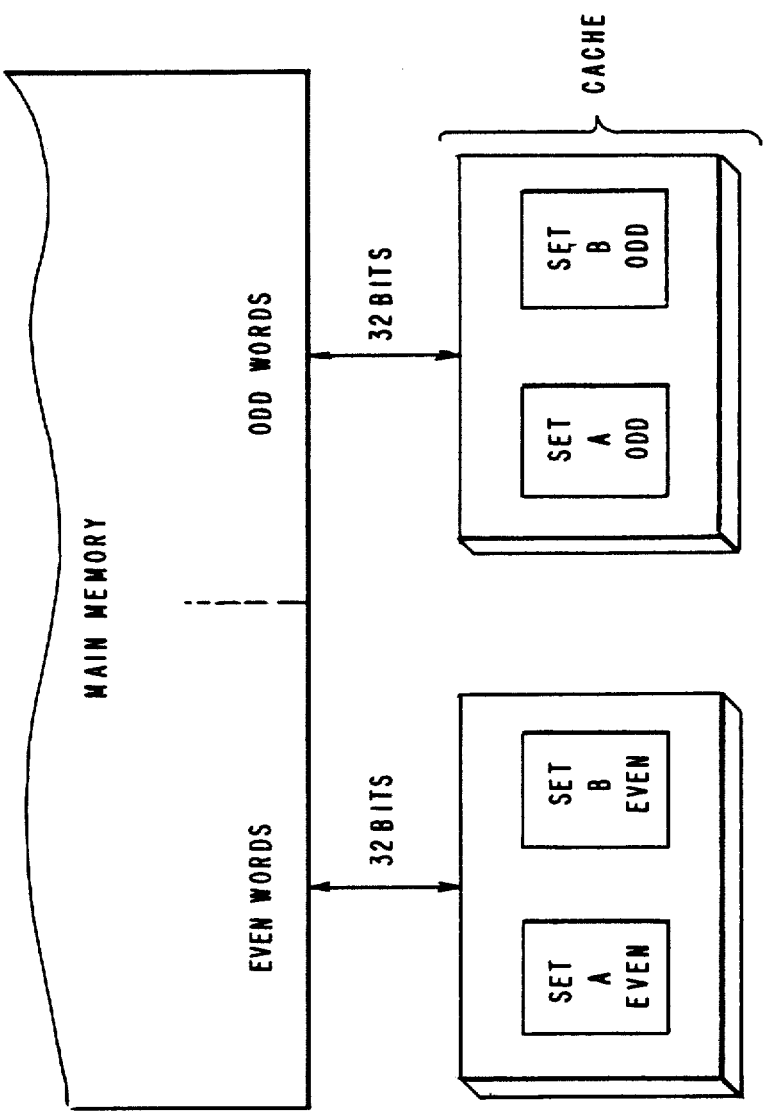
FIG. 9 shows a cache reload path for the case with reload-shift done on the cache chips as in FIG. 7.

The chip of FIG. 8 allows all the above functions and in addition provides the on-chip reload shift function by using a different mapping from that of FIGS. 4 and 7A. This mapping is shown in FIG. 9. Rather than mapping sets in a vertical column on a chip as FIG. 4 of 7C, the mapping is horizontal. The upper portion of the left chip in FIG. 7C, i.e. A even words, and upper portion of the right chip in FIG. 7A, i.e. B even words are both mapped on one chip in the positions shown on the left chip of FIG. 9. Likewise, B odd words and A odd words are mapped on the right chip as shown. Since only even words go to the left chip and only odd words to the right chip, no shifting of the words out of main memory (as shown in FIG. 4) is necessary. For reading, the arrays will have one word "read" from each island and latched in their independent data-out buffers. For writing, after the Delayed-write Enable signal becomes valid, the initial step is to attempt to read one word from each island, however the data-in buffer via one of the internal signals, Enable Left Island, ELI, or Enable Right Island, ERI, will overwrite one of the islands and force new data in. The other island will just perform a normal read operation into the data-out buffer, but nothing will happen to the data, i.e. the tri-state drivers are not enabled.

Figure 10:
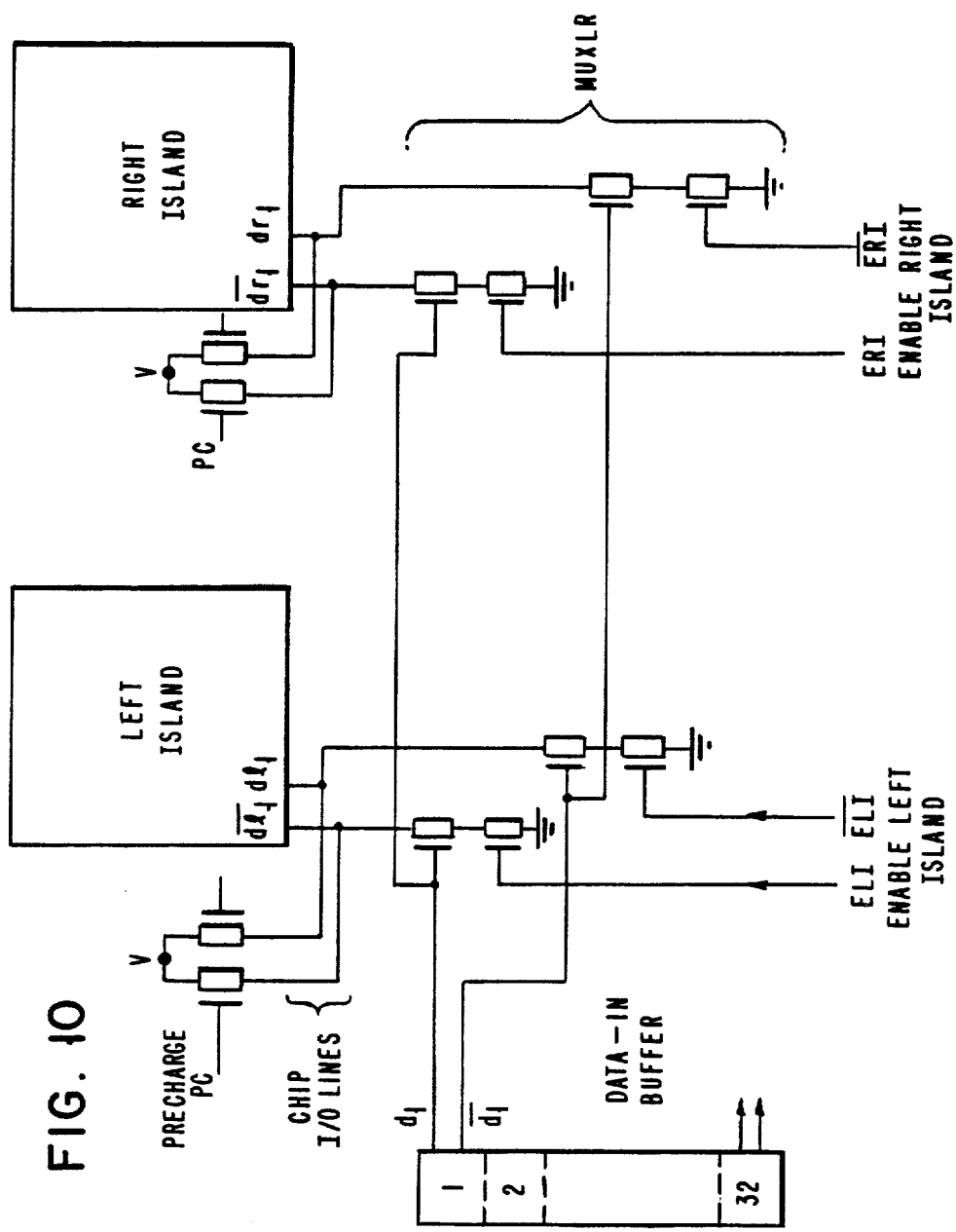
FIG. 10 comprises a combination functional block and logical schematic diagram illustrating a simple circuit for the on-chip reload-shift, comprising the multiplexing of one set of the data-in buffers to either of two islands.

These operations can be achieved in various ways. For instance, if the left and right island reload enable signals are provided externally and on separate pins, the chip can be much as shown in FIG. 8. One circuit for achieving the island enables for both reloading and normal writing is shown in FIG. 10 (one bit only). There are other circuits which could do the same functions, the choice depending on the particular base arrays one starts with as well as the amount of redesigned allowed. In any case, this arrangement allows the use of one set of 32 data-in buffers rather than 2 sets, the buffers being shared between the two islands as shown, since only one island is ever written at any time. The external island reload enable signals, Reload Right Island, RRI, and Reload Left Island, RLI, indicate that a write operation to the appropriate island is to be performed, using data from path 2 of MUXIN. Hence E2 on MUXIN must be made valid, as well as ERI or ELI which are used for both normal writing and reload. Note, during reload, no address translation is necessary so no Delayed-write operation is required e.g. the address is known and available at the beginning of the cycle.

The required logical operations for a normal write, a reload, and a normal read are as follows for the chip of FIG. 8:

Normal Write:

Initial Chip Pin State
External Chip Select, CS, = valid
Write = valid
Address lines = valid before Late Select signal
Data-in from CPU = valid before Late Select signal No operations take place on-chip, except possibly enabling of data path 1 on MUXIN (via E1—don't care), until either Late Select Left, LSL, or Late Select Right, LSR, becomes valid at about mid-cycle. When this occurs, then the internal chip select signal, must become valid (which activates the data-in buffer) and either ELI or ERI also made valid.

Reload

During a reload, it is not necessary to wait for any translation before starting the write operation. Thus external signals Reload Left/Right Island are used directly in combination with 'chip select' (CS) to provide the 4 internal signals, $CS_i$, enable E2 on MUXIN, enable ELI or ERI for the left or right island select.

Normal Read

For reading a late-select cache, the array is accessed in parallel with the translation process. Two words, one from each island are accessed as soon as the CS*Read signal is valid. These two words are latched in the 2 Data-out Buffers. Whenever one of the late-select signals, LSR/LSL becomes valid, E1 or E2 respectively, on MUXOUT becomes valid and connects one of these words to the CPU bus via the tri-state drivers.

Each of the internal signals is logically composed of the following:

| | |
|---|---|
| ELI = (Write) * CS * LSL | (normal write delay) |
| + RLI | (reload, no delay) |
| ERI = (write) * CS * LSR | (normal write delay) |
| + RRI | (reload, no delay) |
| $CS_i$ = CS * (Write) * (LSL + LSR) | (normal write delay) |
| + CS * (Read) + | (normal read, no delay) |
| + CS * (RRI + RLI) | (reload, no delay) |
| E2 (MUXIN) = CS * (RRI + RLI) | (reload only) |
| E1 (MUXIN) = CS * (Write) * (LSR + LSL) | (normal write delay) |
| Optional E1 (MUXIN) = (Write) | (no delay, don't care) |
| E1 (MUXOUT) = (Read) * LSR | (late-select left island) |
| E2 (MUXOUT) = (Read) * LSL | (late-select right island) |

Where: * = a logical AND; + = logical OR

Enables E3 and E4 to MUXOUT are part of the Load-Thru controls and are supplied externally.

Figure 11:
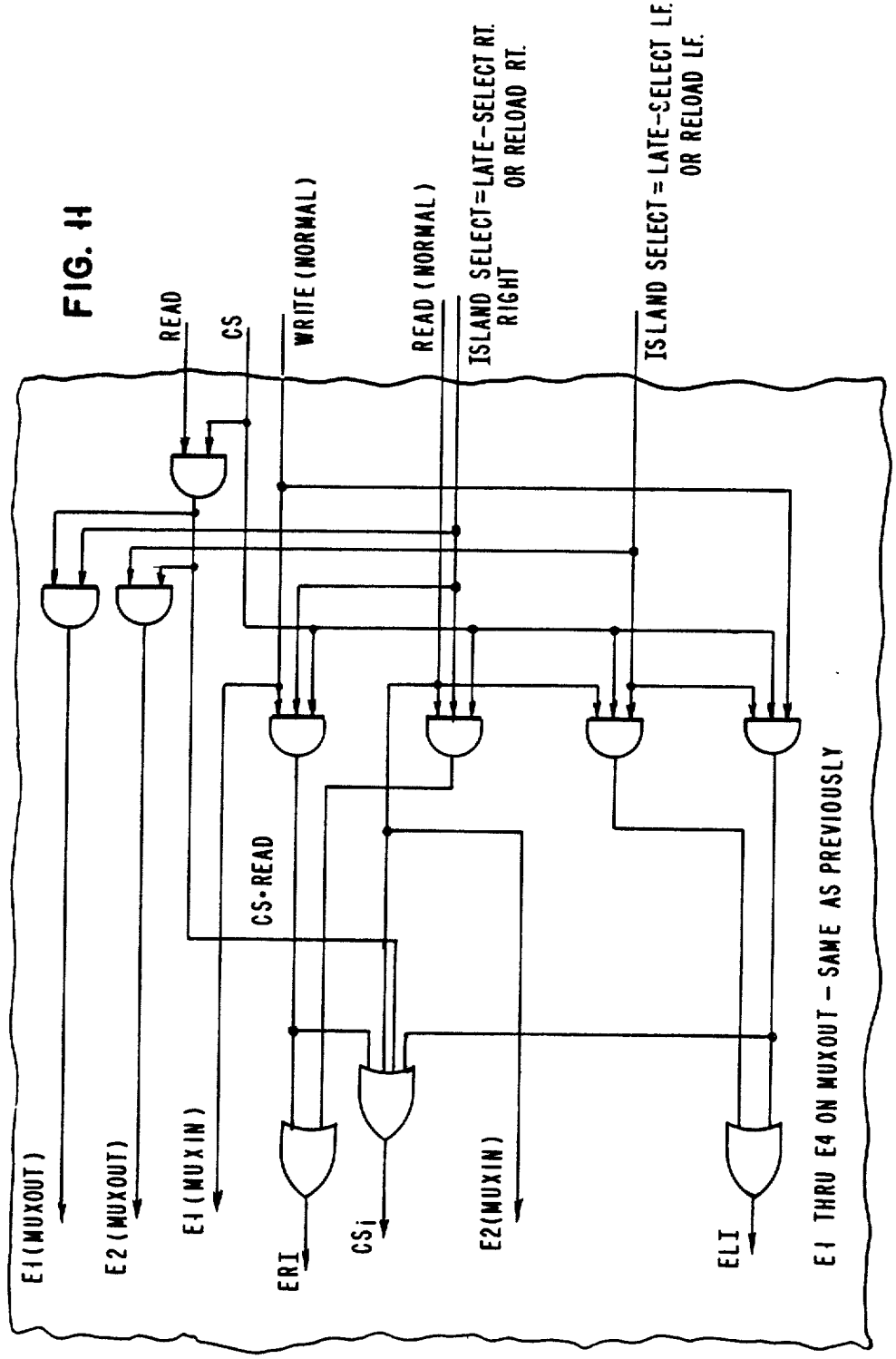
FIG. 11 comprises a logical schematic diagram of a circuit for combining late-select right/left pins with reload right/left pins.

The above logic relations are the ones shown in FIG. 8. Note that the external signals Reload Left/Right Island RLI/RRI can never be valid simultaneously with the two island Late-select signals LSL/LSR since only one cache operation can be performed at one time. Hence it is possible to combine Reload Rt. Island with Late-select Rt. into one pin, and likewise combine Reload Left Island with Late-select Left in one pin. This eliminates two pins, however a new pin "Reload-write" will be needed to give a net savings of 1 pin. The logic for generating the required internal signals can be implemented as shown in FIG. 11. The difference in logic gate count is insignificant but saves 1 pin. The choice between the two methods will be dependent on the CPU generation of these external controls.

For this more versatile chip of FIG. 8, each island must have separate data paths to the Store Back Array, as shown. This adds additional circuitry to the chip but eliminates the complex, time consuming, off-chip shifting which would be needed for the chip of FIG. 5. The net result is a substantial improvement in system performance and elimination of undesirable "glue" chips in the overall system. The logic controls necessary for unloading the Store-Back Array to main memory are straight forward and are not shown.

Figure 12:
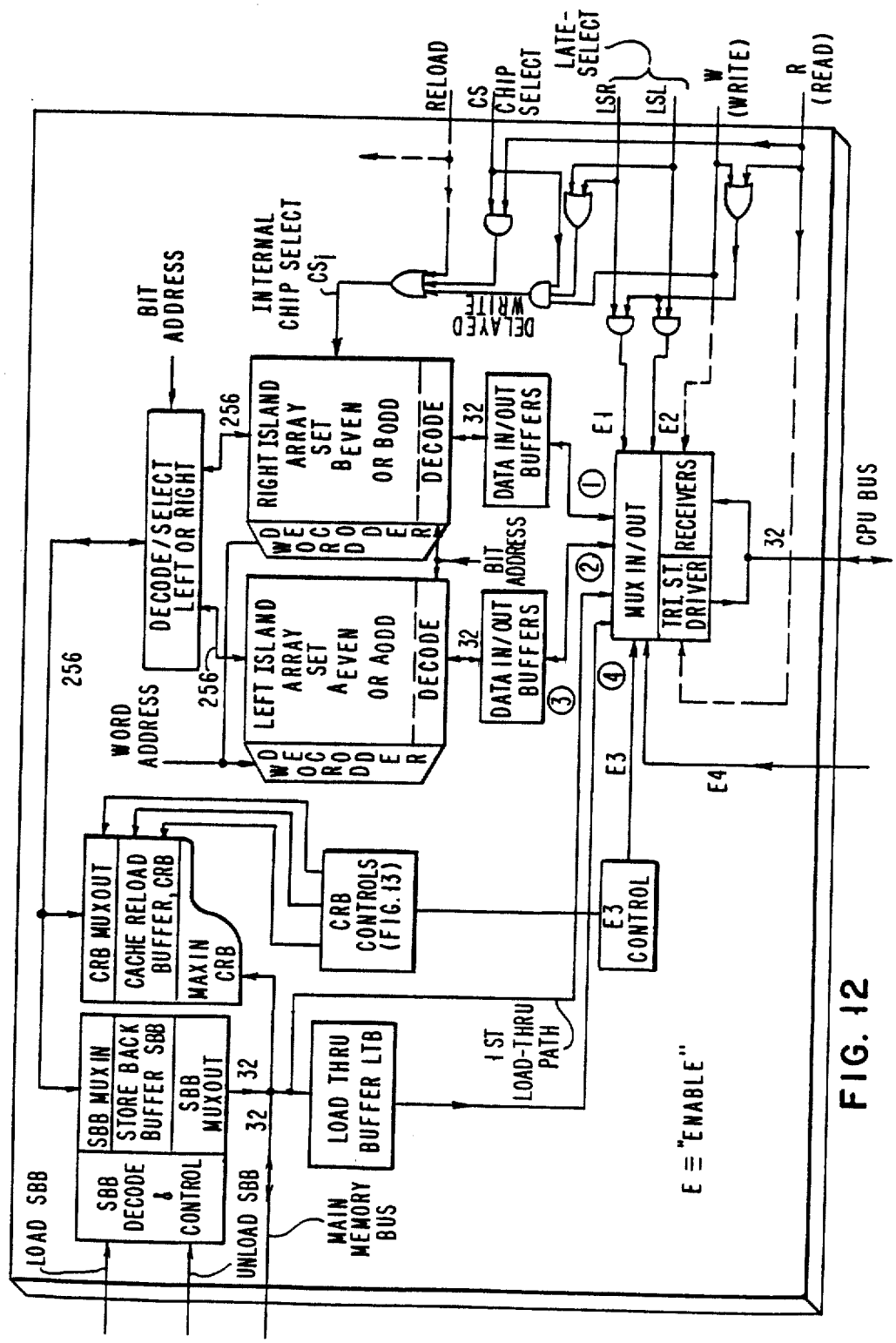
FIG. 12 comprises a functional block diagram similar to FIGS. 5 and 8 showing the chip organization and architecture of a further modification of the invention using modified mapping for on-chip reload shift, storeback buffers and a simple Cache-Reload Buffer augmented by a separate Load-Thru Buffer.

The version of the invention incorporated in FIG. 8 incorporates the preferred mapping and some of the desired on-chip functions, but has one serious limitation, namely, whenever RELOAD is in progress, the CPU can only obtain information from the cache if it is in the Load-Thru Buffer. Any information required from a previously loaded block in the array, or reloading data which is not in the Load-Thru Buffer must wait until the reload is completed. This situation can arise, as discussed in the introduction, and can be very wasteful of processor cycles, especially as the average number of cycles per instruction decreases. The Reload process can be made to be nearly transparent by adding a simple Cache-Reload Buffer, CRB, to the chip unit of FIG. 8. This case is shown in FIG. 12 for a two-word reload path but a larger path is possible. For instance, if the bus width between main memory and each cache chip unit was 72 bits (8 bytes with parity) then 2 even words could be reloaded each cycle to the left chip and 2 odd words to the right chip, with suitable decoding on the chips. Other paths are also possible. Note that each chip unit shown in FIGS. 8 and 12 could be a bank or group of chips, depending on the density and modularity of each chip. For instance, if the chips only had an 18 bit bus to the CPU and 18 bits to the main memory, then 2 left chip and 2 right chips would be required.

During Reload, incoming data from main memory is placed in the Cache-Reload Buffer until the full block is reloaded. Once this is completed, the entire block can be written to the cache array in one cycle. In the mean time, while the reload is in progress, the CPU can make accesses to previously loaded blocks in the array, or to data reloaded in the Load-Thru-Buffer. Reloading data which is in the CRB, but not in the Load-Thru-Buffer cannot be accessed until the reload is completed (this will be changed in the version of FIG. 14 described subsequently).

The external controls and on-chip functions required for this simple Cache-Reload Buffer are shown in FIG. 13. When a "miss" occurs, the address of the word which caused the "miss" is latched in the Reload Address Register, RAR, and the Reload Latch is set valid (the latter is not essential and could be supplied externally as needed). Reloading starts at the word-pair which caused the "miss". Whenever data is supplied from main memory Storage Control Unit, SCU, the Data Valid signal, DV, will be valid. This causes the Decoder RL to decode the lower address bits of the Reload Address Register, RAR, and gates the incoming data into the proper word location within the CRB. Also the DV signal causes the RAR address to be incremented by 1, to the next sequential word, in preparation for the next reloading word pair on some subsequent cycle. Note, any number of cycles can elapse between reloading word pairs, the system automatically accommodates these. This process continues until all data is reloaded into the CRB. At that time, one cache cycle must be stolen to allow writeback of the CRB into the array.

While the reload is in progress, the processor can make requests for Reads or Writes. The chip will determine if the access is to the array or to the reloading block. For this implementation, if the access is to the array, the chip will read the array and dump the data on the CPU bus when the late-select signal becomes valid; if the access was a Write operation, the array data will be overwritten with data from the CPU bus when the late-select signal becomes valid. If the chip determines that the access is to the reloading block, no access is possible and the Wait-Exception-Current cycle, WEC, signal is issued. In order to determine if the access is to the array or CRB, the address and Set ID of the reloading block must be compared to the address and Set ID of the current access.

FIG. 13 shows an implementation in which the address of the reloading block is stored on the chip in the Reload Address Register, RAR, and the contents of this register are compared with the incoming address. The Set ID of the reloading and accessed blocks must also be compared. Ideally, the Set ID of the reloading block would also be stored on the chip alongside the RAR, and another compare of this register with the incoming Set ID (the late select signals LSR, LSL in FIG. 8) would be made. This is not shown on the chip in FIG. 13—this comparison as well as that of the reload address need not be done on chip, although it is preferred. It is an engineering trade-off of speed vs more on-chip functions. To show that these options are available, it is assumed that the Set ID comparison is done off-chip and the result is brought on-chip as the signal "Set ID-Match" shown in FIG. 13. A no-match signal on either the block address or set ID during Reload will result in the signal "Enable Normal Access" in FIG. 13, and data from the array will be read or written. A match on either will prohibit an access from being initiated and the WEC signal will be sent back to the cache controller. This will occur even if the desired data is in the Load-Thru-Buffer. In this implementation, the cache controller will have to know if the information is in the Load-Thru Buffer and send the control signals to access the correct word.

A more generally useful Cache Reload Buffer architecture can be implemented which eliminates the need for the Load-Thru Buffer, and simplifies some of the controls at the expense of introducing additional functions on the cache chip. The preferred implementation with the above fully functional CRB is shown in FIG. 14. A two-way set-associative, late select organization is shown with a cache-main reload block size of $B_r$ bits per block, a 32 bit data path to main memory and 32 bit path to the CPU, per chip, just as previously.

In this configuration, the on-chip controls will look at any access to the chip and internally decide the course of action. If the request is a Read, the chip will determine if the data is in the array, or if it is valid data in the CRB. If either is true, that location will be fetched and the data will be placed on the CPU data bus with no outside control needed. If the request is to the reloading block, but the word has not been reloaded yet, the chip will issue a "Wait-Exception Current cycle" signal, WEC, and the cache controller must reissue the request, or abort. If the request is a Write, the chip will once again decide if the data is in the array or CRB. If in the array, the word will be overwritten. If the write is to a valid word already reloaded in the CRB, that word will be overwritten. If this word is not yet reloaded into the CRB, the WEC signal will be set valid by the chip and the controller must reissue the write request or abort, or whatever. The chip will handle the subsequent request in the same manner—it does not have any "retry" capability but rather is a slave and performs whatever request appears on the control pins.

Figure 15A:
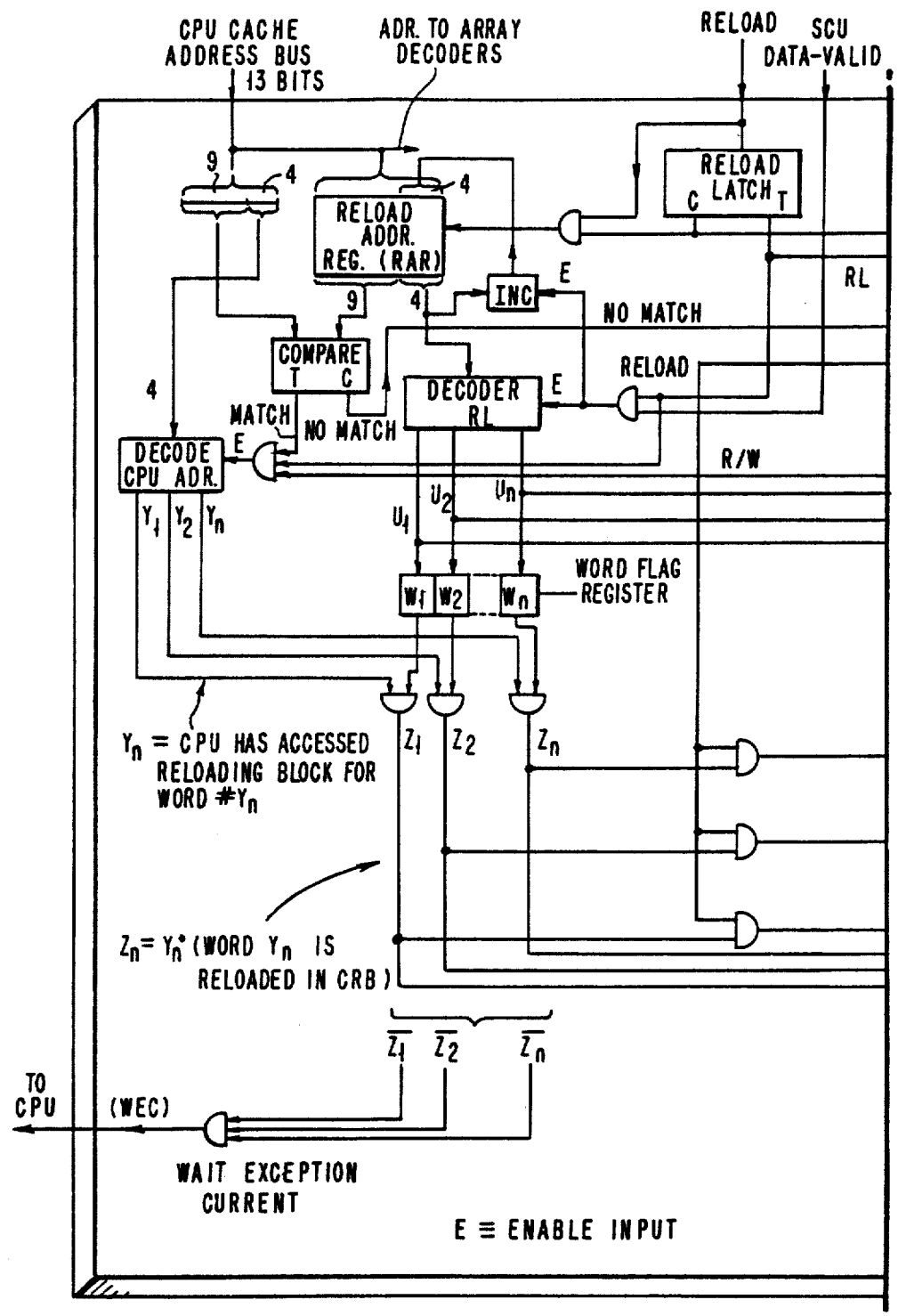
FIGS. 15A and 15B comprise a functional schematic diagram of the Cache-Reload Buffer controls shown in FIG. 14 providing simultaneous reloading and access to the same or different block in the cache.
Figure 15B:
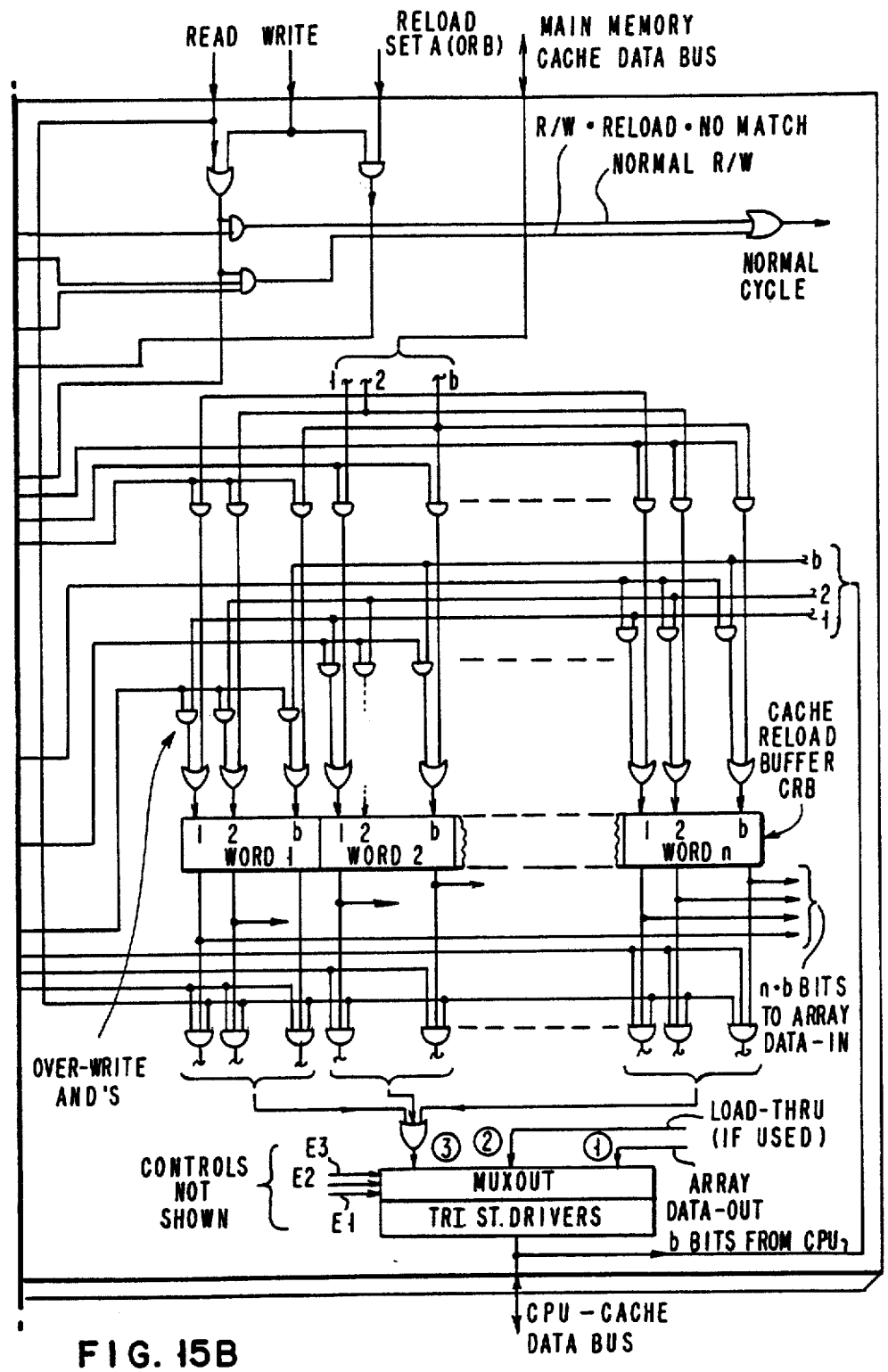

The on-chip logic for determining if a request is to the array or CRB, and if the latter, for accessing the CRB for a Read or Write, is shown in FIG. 15. The word-valid flags, $W_n$ are reset to 0 whenever a reload is initiated, and set to 1 when the corresponding word or words are reloaded from main memory. The Data-Valid signal, DV, from the storage controller enables this setting, and also increments the appropriate lower order address bits of Reload Address Register (RAR). The RAR is initialized at reload time with the address of the word which caused the "miss" and thus is set to start loading at the correct word boundary—this address is also used to do the load-through of the word which caused the "miss". The Set ID comparison is assumed to come from off-chip, as previously.

The exact details of any additional controls are not shown, such as controls for the load-through path and the Store Back Buffer since they would depend on the modularity and parameters of the actual chips used for implementation. However, they would be straightforward and are not specified in detail as they would be obvious to those skilled in the art and such details would obfuscate the invention.

Figure 16A:
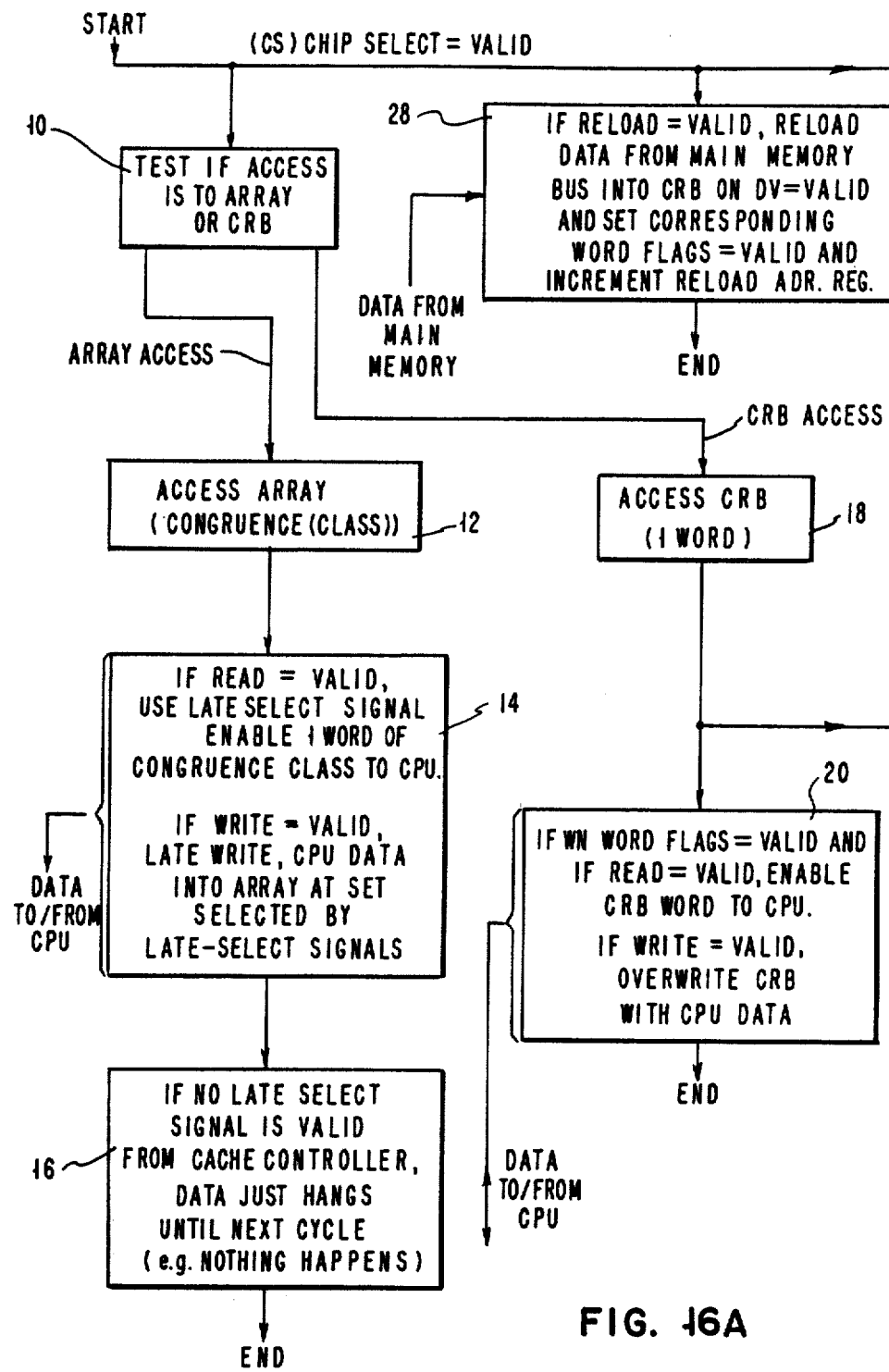
FIGS. 16A and 16B comprise a high level flow chart illustrating the operational sequences in the modified cache array of the preferred embodiment of the invention shown in FIGS. 14 and 18.
Figure 16B:
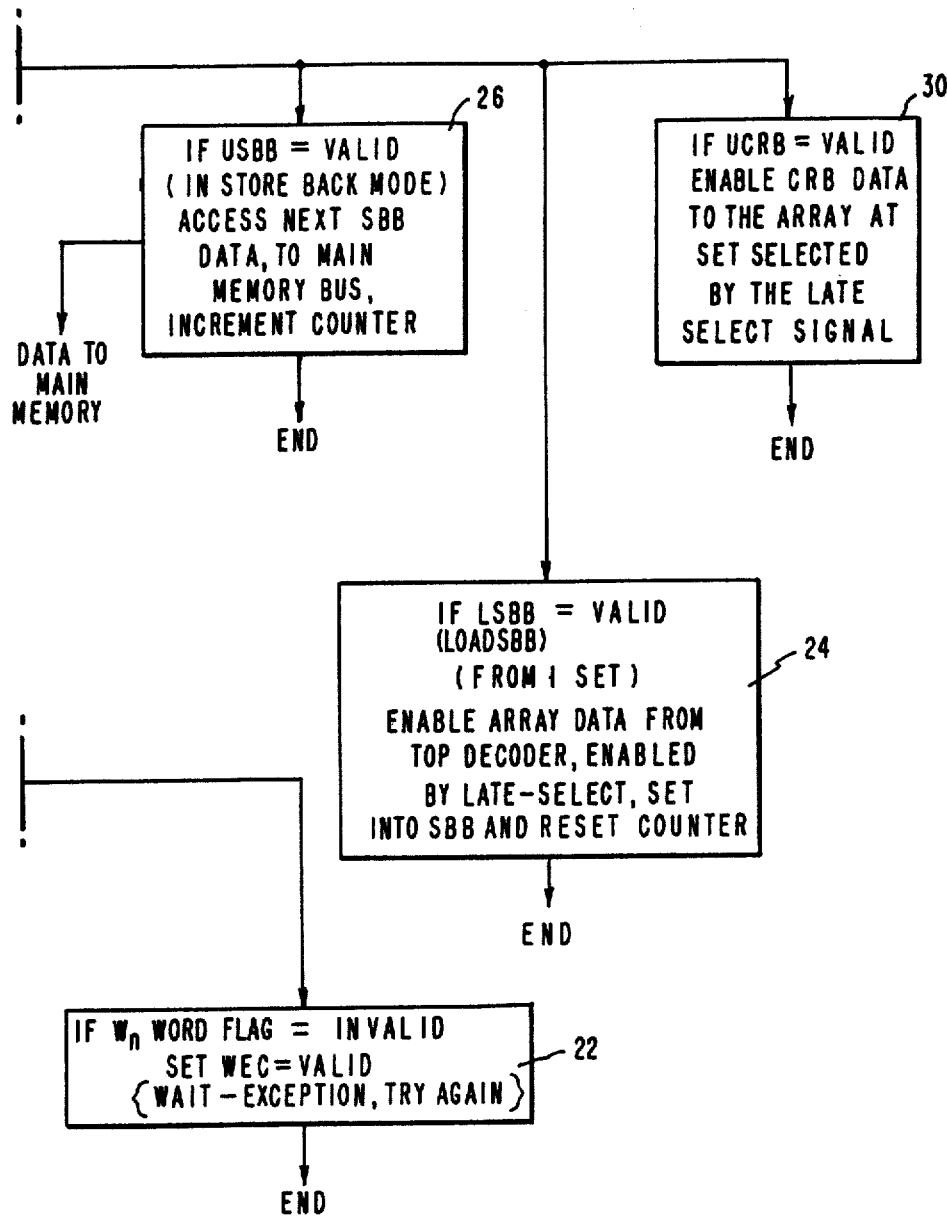
Figure 18A:
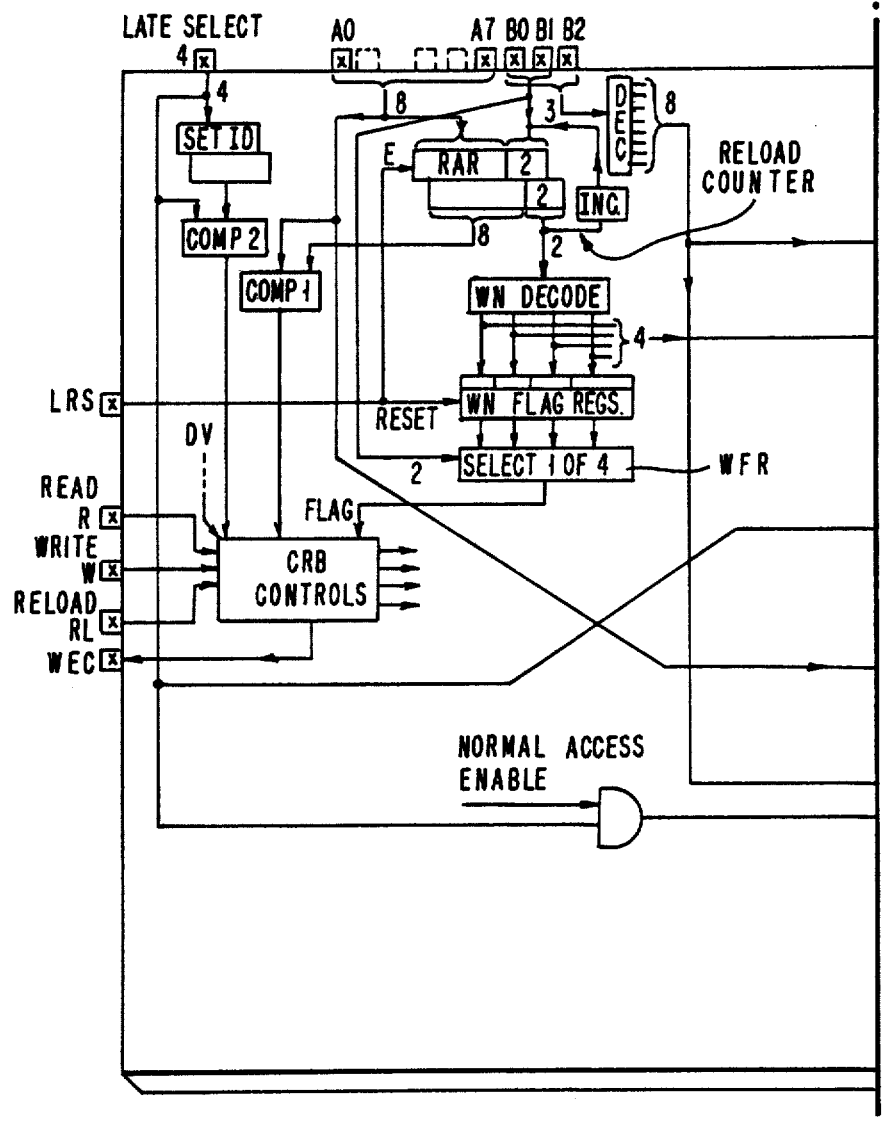
FIGS. 18A and 18B comprise a functional block diagram of a slight variation of the preferred embodiment of the invention as shown in FIGS. 14 and 15 and includes the primary functional units, data paths and control elements in the single figure.
Figure 18B:
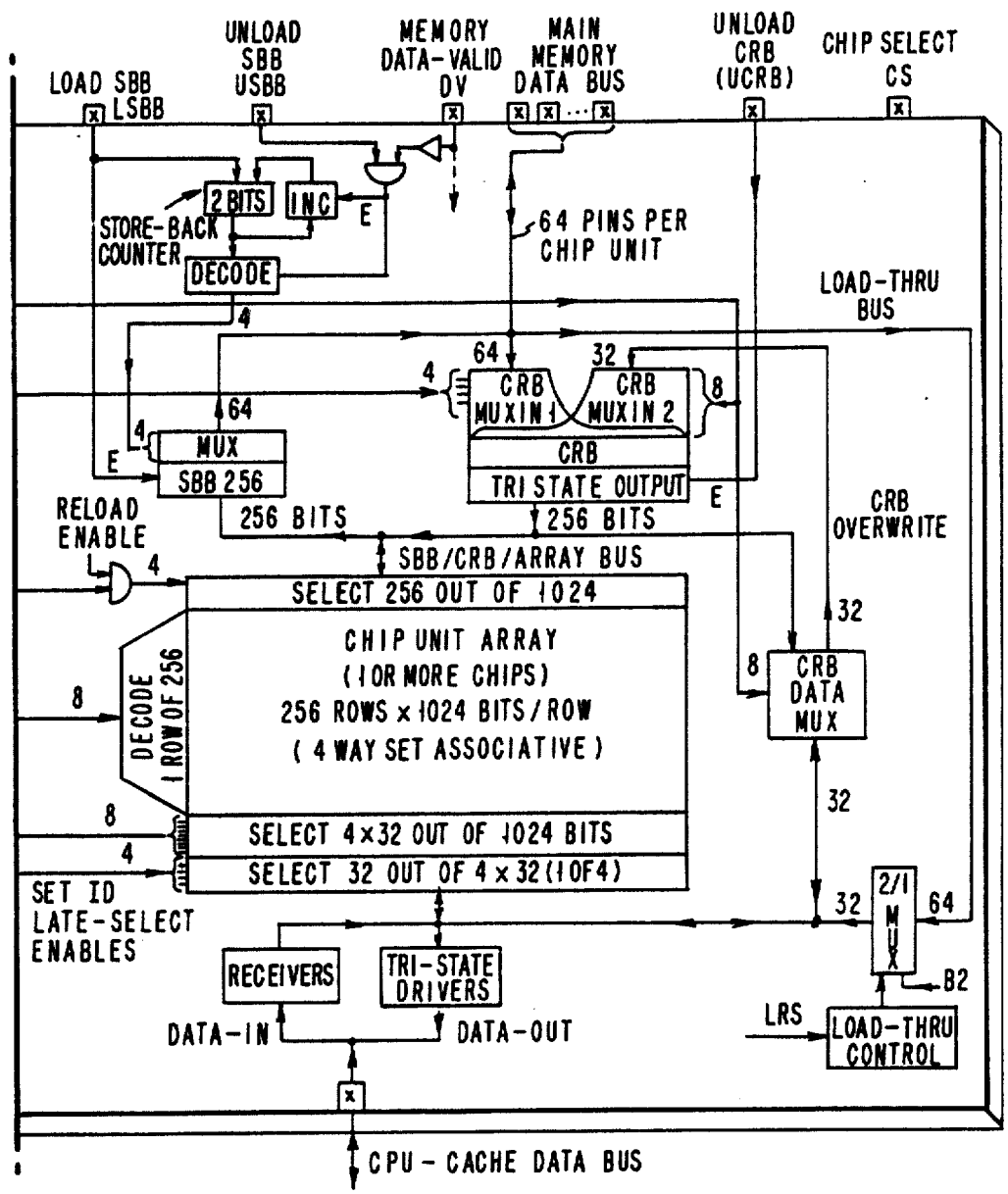

The flow chart of FIG. 16 summarizes the operation of the preferred embodiment of the invention as shown in FIGS. 14, 15 and 18. It should be remembered that, given the functions disclosed in FIGS. 14, 15 and 18 for the chip, the various address decoding and array accessing of the on-chip cache are performed totally on-chip. However, the various command signals and the array addresses must come from off-chip, as indicated clearly in FIGS. 14, 15 and 18, from a conventional cache controller. FIG. 18, in effect, combines the major functional components of FIGS. 14 and 15 onto a single figure. It will of course be noted that the embodiment of FIG. 14 illustrates a two-way set-associative cache and that FIG. 18 illustrates a four-way set-associative cache.

Returning to FIG. 16, to initiate any of the sequences first the chip select line from the storage control unit (for the system array) must be valid. The first sequence of operations to be described will be to the CPU interface for either a read or a write. To begin this sequence a test is made in Block 10 to see if the access is to the array or to the CRB. This test is done in the compare unit wherein the address being requested is compared with that in the reload address register which indicates the address of the block currently stored (or to be stored) in the CRB. If there is no match the system would proceed to Block 12. If there were a match the system would proceed to Block 18. In Block 12 the array is accessed at the specified row address which will cause the addressed word in each of the sets to be placed in the data in/out buffers at the bottom of the array as shown in the figures. The specific word of each block is accessed via the bit address supplied to the decoders at the bottom of the arrays. This is shown somewhat more clearly in FIG. 18 in the upper portion of the decoder at the bottom of the chip unit array wherein a selection of 32 bits from each associative set is effected. Assuming, of course, that a "hit" is determined from the search of the cache directory, either a read or write operation will next be performed. The result of the "hit" determination will cause a particular logical word from one of the sets to be selected. The set selection function is built into the late-select signal which indicates which of the accessed words is to be read from or written into the array.

Proceeding to Block 14, if the "read" is valid the late-select signal will enable one of the words stored in the data in/out buffers to be gated to the CPU.

If the "write" signal is valid, a word will be gated into the chip array through the in/out multiplexer (as shown in FIG. 14) to the appropriate word in the array selected by the late-write enable signal.

Proceeding to Block 16, if no late-select signal is valid from the cache controller, nothing further occurs and the chip would await until it receives further commands from the cache controller. This would be the situation if a cache "miss" had occurred, at which point the cache controller would initiate a "miss" sequence which would in turn involve determining which set is to be replaced by an appropriate algorithm, if necessary, storing this set which is currently in the cache back into main memory via the store-back buffer, and loading new data from the memory into the cache via the Cache-Reload Buffer, etc.

Proceeding to Block 18, this block indicates that the particular word to be accessed is currently stored in the CRB. Since a complete block is assumed to be stored in the CRB, the particular word must be indicated by decoding the appropriate bits of the overall address. However, it should be understood that at any given time the system must first determine if the new data has been accessed from memory and stored in the CRB to assure consistency of data, as will be understood by those skilled in the art. This is accomplished in the present system by setting the several word flags WN for each word in the CRB, which flags are stored in the WFR. Therefore, before a word in the CRB can be accessed, the particular word flag pointed to by the address must be valid. If the appropriate word flag is valid and if the "read" signal is valid, the appropriate word will be gated out of the CRB via the CRB MUX-OUT and the array MUX in/out to the CPU bus on FIG. 14.

If a "write" operation is to be performed in the CRB, again the appropriate word flag must be valid and presumably the "write" line will be valid, which will cause a new word of data to be gated in from the CPU bus through the array MUX in/out and into the CRB via the overwrite MUX shown in FIG. 14. It will be noted that in FIG. 18 both the "read" operation and "write" operation utilize the CRB data MUX shown to the right of the chip unit array.

This completes the CRB access cycle, assuming, of course, that the particular word being accessed had its appropriate word flag set to valid. If, however, the desired word flag were invalid, the system controls would cause a wait exception check (WEC) to be sent to the cache controller (in FIG. 15A) which would indicate that the desired word had not yet been loaded into the CRB from main memory and the memory access would go into a "wait" state for a predetermined number of cycles and the requested data would then be accessed as previously until successful. In FIG. 18 this signal is shown as the "exception" signal emanating from the CRB controls block.

The next operations to be described will involve reloading of the cache which, in turn, first requires storing the current data for a modified block in the cache back into main memory via the store-back buffer (SBB) and then reloading first the Cache-Reload Buffer (CRB) and then transferring the data from the CRB into the cache. These functions are accomplished via Blocks 24, 26, 28 and 30, respectively.

When a cache "miss" occurs and if the replaced block has been modified, ultimately the LSBB line will be valid (load store-back buffer). This signal will enable the upper decode/select decoder and the complete block of data from the selected set will be transferred into the store-back buffer. The particular set is, of course, selected by the late-select signal per se. A store-back counter from the SBB controls is also set. This is not shown in FIG. 14; however, it is shown in FIG. 18 and is used to control the sequential gating of data from the SBB back to main memory. As will be appreciated in the embodiment of FIG. 14, eight cycles would be required to gate all 256 bits in the SBB back to main memory since the main memory bus is 32 bits wide and a data block is 256 bits. Similarly, in the embodiment of FIG. 18 only four store-back cycles would be required since in this case the main memory bus is shown to be 64 bits wide. This ends the procedure Block 24.

Next the contents of the SBB must be written into main memory, which is done in Block 26. For this block to be entered, the USBB signal must be valid. When this occurs, the SBB is accessed and the appropriate word, e.g., 32 bits in FIG. 14; 64 bits in FIG. 18, will be gated to main memory and appropriately stored at an address therein selected by the off cache memory controls. Additionally, the SBB counter will be incremented and second, third, fourth, etc. store-back cycles will follow until all of the words making up the block stored in the SBB have been appropriately transferred back to main memory. When this has occurred the appropriate memory controls will indicate that the procedure has completed.

What must next occur is for a new data block to be loaded from the main memory into the CRB. When the "reload" signal is valid and the "DV" (data valid) signal is valid, the first word will be gated from main memory into the CRB and a corresponding word flag WN will be set to valid and the RAR counter is incremented so that the next word making up the reload block will be entered into the proper word position in the CRB. This counter is not specifically shown in FIG. 14 as it exists in the CRB controls; however, it is shown in FIG. 18. This counter operates in substantially the same way as the store-back counter and causes the 32 or 64 bits sequentially presented on the main memory bus to be stored in the proper word location in the CRB. This operation will be continued until the complete block has been reloaded, at which point the procedure terminates.

The final operation is to transfer the contents of the CRB into the array and into the proper associative set as determined by the replacement algorithm. Block 30 shows this operation. If the "UCRB" signal is valid, the CRB MUXOUT will cause the data in the CRB to be transferred in parallel, e.g., all 256 bits through the upper decoder for the array and into the proper set within the array as determined by the set signal on the late-select line. In FIG. 18 the Tri State Output immediately below the CRB is energized by the "UCRB" signal. It will be noted that the operation of reloading the array from the CRB is carried out in one memory cycle, e.g., all 256 bits making up the data block within the particular set being replaced are gated into the proper set within the array.

While the above represents a high level functional description of the operation of the system and does not detail every single functional unit shown in FIGS. 14, 15 and 18, it is believed that their operation would be well known and obvious to those skilled in the art and to detail every function is deemed unnecessary.

Figure 17:
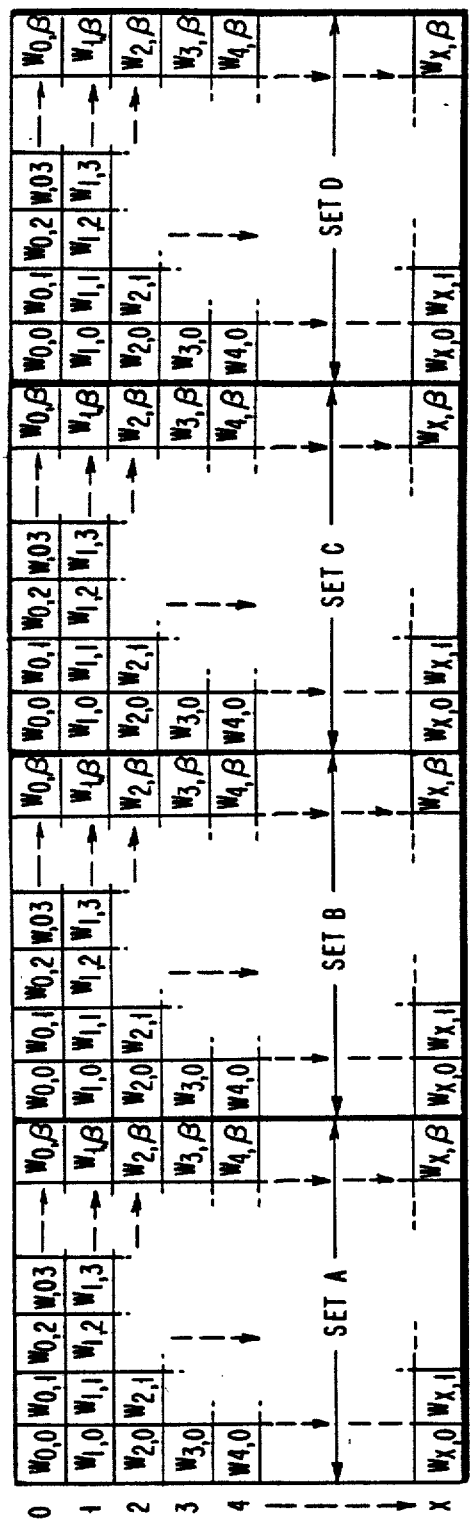
FIG. 17 illustrates the chip unit memory array mapping wherein one entire block of data from each of four sets reside at a single row address.

FIG. 17 comprises a memory mapping diagram of a preferred array mapping for use with the present invention. It will be noted that the mapping in the figure is shown for four sets, e.g., A–C, as would be utilized in the embodiment of FIG. 18; however, the mapping applies equally well for an array comprising only a Set A and B, as would be the case in the embodiment of FIG. 14. In FIG. 14 embodiment Set A would be in the left island and Set B would be the right island. As shown, all of the words of a complete block for the indicated sets which map to the same congruence class would be on a single horizontal line or row. Thus, for a given cache access, whether for a normal access or for reloading, the row address is performed as shown schematically by the decoders at the sides of the array in both FIGS. 14 and 18. The final selection is done respectively in the decoders at the bottom and top of the array. The decoding or selection at the bottom of the array which interfaces with the CPU is performed in two stages: first the properly addressed word from each set is selected in a first stage and the final set selection is performed by the late-select enable signal which gates the desired 32-bit word of the desired set either into the array on a write cycle or to the CPU in a read cycle. This is illustrated very clearly in FIG. 18.

Similarly, the upper decoder selects all of the words making up a particular data block in one of the four arrays addressed, and places these on the SBB/CRB/array data bus. As will be understood by those skilled in the art, this final selection is done via properly integrated bit-line decoders associated with the special I/O buffers shown schematically as connected to the top and bottom of the array. It will be further understood that both of these decoders could be located at either the top or the bottom of the array, the only requirement being that each would be connected in parallel to all of the sense lines coming out of the array (e.g., 1024 in the embodiment of FIG. 18), only those lines being selected in a particular decoder and buffer which are specified by the particular address supplied and function being performed whether normal read/write access or reload.

FIG. 18, as noted previously, comprises a high level functional block diagram of a variation of the preferred embodiment shown in FIGS. 14 and 15. It is essentially a concatenation of the major functional components shown in those two figures, as mounted on the single chip structure. As will be noted the detailed logic circuitry shown in FIG. 15 is not included, as it is believed obvious to those skilled in the art. It will also be noted that the on-chip cache array is shown as four-way set-associative rather than two-way set-associative. Also, the actual chip unit array is shown as a single block rather than as two islands, as is the case in FIG. 14. The numbers adjacent to the various data paths on the figure represent the number of the bits appearing on the associated bus. All of the functional units or blocks are clearly indicated by their mnemonic names, e.g., CRB, SBB, RAR, etc. The main memory data bus and the CPU/cache data bus are clearly shown, as well as the internal data buses interconnecting the array, the store-back buffer and the Cache-Reload Buffer.

The operation of the complete cache chip architecture of FIG. 18 is identical to that described for FIGS. 14 and 15 with the exception, of course, that a four-way set-associative rather than two-way set-associative cache is described. The operation of the store-back counter and reload counter was described previously with respect to the flow diagram of FIG. 16.

As will be apparent, the embodiment of FIG. 18 comprises a 256-K bit chip unit (32K bytes) shown with all addressing bits for a 64-K byte (requires two such chip units) four-way set-associative late-select cache architecture using cache blocks of 64 bytes (bits $B_0$–$B_5$). The full address for a complete 64-K byte array is 16 bits wide made up of the eight bits $A_0$–$A_7$ which provide the word or row selection, and six bits $B_0$–$B_5$ which are utilized to properly access the upper and lower decoders. Finally, two set-associative bits are included which select the proper set. They are not shown, as these bits are processed off-chip in the cache control circuitry, the set selection being provided to the chip via the late-select signal which, as described previously, selects the proper set from the congruence class for a reload or normal access, as will be well understood. As is apparent, the CPU logical word is 32 bits. The reload path is eight bytes per chip unit, or 16 bytes if two such chip units are used. It will be apparent that other configurations would be possible if chip units were used having different widths than those shown. As will also be apparent to those skilled in the art, to build up a desired memory width, an appropriate number of such chip units would be paralleled. It is to be understood, however, that all of the essential architectural controls as shown in the figure would be on each of the individual chip units.

Also, both of the compare blocks COMP1 and COMP2, one of which compares the contents of the reload address register with the current access cycle and one for determining a match with the current set ID, are shown on-chip. However, either or both could be off-chip as well as the word flag register (WFR) without changing the essential architecture of the chip. In FIG. 15 only the compare circuit (COMP1) comparing the current contents of the RAR is shown.

The following table synopsizes the features of the various disclosed and described embodiments of the present invention beginning with the lowest level of cache enhancement shown in FIG. 5 to the maximally enhanced, full-feature version of the preferred embodiment of FIG. 14.

TABLE 1

| FUNCTION/<br>FUNCTIONAL UNIT | FIG. 5 | FIG. 8 | FIG. 12 | FIGS.<br>14 & 18 |
|---|---|---|---|---|
| STORE-BACK<br>BUFFER (SBB) | YES | YES | YES | YES |
| CACHE RELOAD<br>BUFFER (CRB)<br>(load only) | NO | NO | YES | NO |
| TWO DECODERS ON<br>CHIP MEMORY/CPU | YES | YES | YES | YES |
| CACHE RELOAD<br>BUFFER (CRB)<br>(load/access) | NO | NO | NO | YES |
| MODIFIED<br>MAPPING | NO | YES | YES | YES |
| LOAD THROUGH<br>CONTROLS<br>(first word) | YES | YES | YES | YES |
| LOAD THROUGH | YES | YES | YES | NO |

TABLE 1-continued

| FUNCTION/<br>FUNCTIONAL UNIT | FIG. 5 | FIG. 8 | FIG. 12 | FIGS.<br>14 & 18 |
|---|---|---|---|---|
| BUFFER (LTB)<br>LATE WRITE<br>ENABLE | YES | YES | YES | YES |

CRB (load only) - can only be reloaded from main memory, no direct access from CPU.
CRB (load/access) - can be accessed for read or write by the CPU for any previously reloaded words simultaneously with reload from main memory.
YES means function implemented.

While the invention has been disclosed and described with respect to a number of progressively sophisticated embodiments, e.g., FIGS. 5, 8, 12, 14 and 18, it is to be understood that still further changes could be readily made in the overall system architecture without departing from the spirit and scope of the invention as set forth in the appended claims.

For example, in the preferred chip unit configuration a requirement is made that a minimum of one entire block from each of the four sets reside at a single row address to give maximum parallelism in the reload path. This results from the specification that the SBB will be loaded from the cache array on one cycle and that the CRB will be unloaded to the array in one cycle. This restriction could be relieved by specifying that the SBB be loaded from the array and the CRB be unloaded to the array in two or three cycles, since there will typically be two or more cycles idle for each of these operations. If, for example, two cycles were chosen for this operation, then one entire block from each set could reside at two row addresses. This would provide more flexibility in the overall cache specification and only add a small amount to the on-chip controls.

As noted previously with reference to FIG. 18, the overall cache could be built from a plurality of such chip units to achieve larger memory sizes as desired. It will of course be understood that the essential on-chip architecture would be the same for such implementations, the only difference being that different subsets of the addresses would be supplied to the different chips from the overall cache controller, as would be understood by those skilled in the art.

Conclusions

The previous description of the invention has demonstrated that a cache system operates in two distinct modes, normal access and reload. During normal access, a typical high performance processor can require on average between one and two word accesses per processor cycle at a continuous rate. Whenever an access "miss" occurs, the system band width requirement becomes a single burst of multiple words (equal to the block size) which should ideally be loaded on one main memory cycle and occurs infrequently, at random intervals. Unfortunately, the latter requirement is very difficult and costly to implement, resulting in performance degradation in actual systems. This has led to various cache organizations in an attempt to reduce the reload penalty. As discussed at length previously, ordinary static RAM chips are optimized for normal access in the cache array and introduce considerable complexity in the reload path. This complexity takes several forms during the various functions which need to be performed for a reload, in combination with the cache organization. The on-chip cache architecture described herein incorporates an architecture which represents an optimal trade-off between the array/chip design and the functional requirements of the overall system. By judicious organization of the chip in this architecture, most of the reload process is made to appear as occurring on one memory cycle, while still allowing a set-associative, late-select cache organization. The internal array need be only a one-port cell design and the additional functions are easily integrated with the proper choice of mapping of the cache blocks to the physical array. Thus, in its broadest concept, the invention discloses a single port cache memory array architecture with two separate decoding functions, one to the main memory interface and one to the CPU interface which, together with the novel mapping disclosed, provide significantly enhanced cache memory performance.

Having thus described out invention, what we claim as new and desire to secure by Letters Patent is:

1. A VLSI cache memory subsystem including, on-chip a single-port, late-select, cache array organized to be n-way set associative said chip including a plurality of functionally interrelated units on-chip with the cache array which comprise; (1) means for performing a normal CPU read access operation including means for accessing the chip in a fast, "late-select" mode, which is n-way set-associative, in effectively one memory cycle for a read operation to the CPU, (2) means for performing an internal late-write operation including means for allowing a CPU "write" to one of n accessed words in effectively one cycle, and (3) means for performing a cache reload operation including means for providing a highly parallel multi-word store-back and reload operation to and from main memory, to reduce the reload time for a store-in cache organization, said means for performing the reload operation additionally including means for performing a nearly transparent, multiple word reload and including a Cache-Reload Buffer, a Store-Back Buffer and a load-thru mechanism all included on the chip for reloading, said system further including two separate decoders integrated on the chip, one actuable for normal single word read/write cache access by the CPU and one actuable for parallel multi-word cache reload, and means to access date in the Cache Reload Buffer which has been transferred out of main memory to the chip but not yet reloaded into the cache array, said two decoders providing two different accessing modes required for CPU or main memory operations.

2. A late-select VLSI cache memory subsystem chip comprising an array having a single access port and a plurality of functionally related elements entirely mounted on-chip with said array and efficiently interconnected therewith to provide enhanced functionality and speed, said subsystem chip including;

n separate set-associative memory segments in the on-chip cache array, first addressing/decoding means interfacing the array with the CPU, comprising means for accessing first, n single logical words, one from each associative set in the array and for accessing next a single logical word from a single associative set from said n words as pointed to by the overall cache address presented to the system, second addressing/decoding means interfacing with the main memory for accessing an entire data block from a single associative set in the array, means utilizing said first addressing means for a normal cache read/write access, and means utilizing said second addressing means for memory store-back and cache reload operations, means for performing a late-write operation which allows a word to be written into the array from the CPU at one of n accessed words within a single memory cycle, control means including first buffers for interfacing logical words to be accessed to/from the cache and from/to the CPU in a single array access cycle, and control means including second buffers for interfacing blocks to be accessed to/from main memory and from/to the cache for reading/writing multiple logical words of a single associative set's data block in a single array access cycle.

3. A VLSI cache memory subsystem chip as set forth in claim 2, said first and second addressing/decoding means including a common portion for selecting a particular row in said array, said row including a multiple word data block for each of the n associative sets in said array.

4. A VLSI cache memory subsystem chip as set forth in claim 3 including late-select means for providing a signal to said chip indicating which associative set is required for a particular access.

5. A VLSI cache memory subsystem chip as set forth in claim 4 including Store-Back Buffer means for temporarily storing a multiple-word data block accessed via said second addressing/decoding means and means for storing said data block in said Store-Back Buffer prior to transfer to the main memory, and means for accessing said Store-Back Buffer means to transfer a block of data to the main memory.

6. A VLSI cache memory subsystem chip as set forth in claim 5 including a Cache-Reload Buffer for storing a multi-word data block transferred from main memory for reloading into the cache array via said second addressing/decoding means, and internal bus means on said chip having a band width equal to the complete multi-word data block to be accessed in a single associative set within said array connected between the array, the Store-Back Buffer and the Cache-Reload Buffer.

7. A VLSI cache memory subsystem chip as set forth in claim 6 wherein said Cache-Reload Buffer includes control means including a reload address register and means for interrogating the contents of said register on every normal read/write cache access from the CPU to determine if a requested data word is currently stored in said Cache-Reload Buffer, and means for accessing the addressed word in the Cache-Reload Buffer for read/write operations between the CPU and the cache chip.

8. A VLSI cache memory subsystem chip as set forth in claim 7 including control means associated with both said Cache-Reload Buffer and said Store-Back Buffer to indicate when the Cache-Reload Buffer has been fully loaded from main memory and for indicating when the Store-Back Buffer has transferred its complete contents to main memory and wherein the memory/cache bus has a narrower band width than said internal cache chip bus.

9. A VLSI cache memory subsystem chip as set forth in claim 2 including a load-through means comprising a data path for transferring an addressed logical word directly from main memory to the CPU externally of said array during reload when said logical word is transferred from main memory to the chip.

10. A VLSI cache memory subsystem chip as set forth in claim 9 wherein said load-thru means include a load-thru buffer and means for storing a particular data word therein before transferring same to the CPU.

11. A VLSI cache memory subsystem chip as set forth in claim 4 wherein the late-select mechanism includes means for detecting a late-select timing signal to activate the late-select operating mode in the array and means for decoding the late-select signal to determine which associative set is to be selected for any CPU access, main memory reload or store-back access.

12. A VLSI cache memory subsystem chip as set forth in claim 8 wherein said internal chip bus has a band width equal to the band width of a complete data block stored in the array and wherein a complete data block may be accessed in a single cache memory cycle for reload and store-back operations.

13. A VLSI cache memory subsystem chip as set forth in claim 12 including; a plurality of separate external circuit connections mounted on the chip boundary for receiving/transmitting data addresses and control signals from an off-chip memory control unit to the functional units of the chip, including connections to:
   a CPU data bus,
   a main memory data bus,
   an address bus,
   a "read" signal,
   a "write" signal,
   a load SBB signal,
   an unload SBB signal,
   a load CRB signal,
   an unload CRB signal,
   a chip select signal,
   a memory data valid signal, and
   a reset RAR & WFR signal.

14. A VLSI cache memory subsystem chip as set forth in claim 12 further including means for allowing the CPU to access a "valid" word in the CRB at a first cache address concurrently with the array being unloaded from a second cache address into the SBB.

15. A late-select VLSI cache memory subsystem chip comprising an array having a single access port and a plurality of functionally related elements entirely mounted on-chip with said array and efficiently interconnected therewith to provide enhanced functionality and speed, said subsystem chip including;
   n separate set-associative memory segments in the on-chip cache array,
   first addressing/decoding means interfacing the array with the CPU, comprising means for accessing first, n single logical words, one from each associative set in the array and for accessing next, a single logical word from a single associative set from said n words as pointed to by the overall cache address presented to the system,
   second addressing/decoding means interfacing with the main memory for accessing an entire data block from a single associative set in the array,
   said first and second addressing/decoding means including a common portion for selecting a particular row in said array, said row including a multiple word data block for each of the n associative sets in said array,
   means utilizing said first addressing means for a normal cache read/write access, and
   means utilizing said second addressing means for highly parallel multi-word memory store-back and cache reload operations,
   means for performing a late-write operation which allows a word to be written into the array from the CPU at one of n accessed words within a single memory cycle,
   control means including first buffers for accumulating logical words to be accessed to/from the cache and from/to the CPU in a single array access cycle, and
   control means including second buffers for accumulating blocks to be accessed to/from main memory and from/to the cache for reading/writing multiple logical words of a single associative set's data block in a single array access cycle,
   a late-select mechanism including means for providing a signal to said chip indicating which associative set is required for a particular access.

16. A VLSI cache memory subsystem chip as set forth in claim 15 wherein the reload data path includes a store-back buffer for temporarily storing a multiple word data block accessed via said second addressing/decoding means when it is determined that said data block has been altered, and means for storing said data block in said Store-Back Buffer prior to transfer to the main memory, and
   means for accessing said Store-Back Buffer means to transfer data to the main memory,
   a Cache-Reload Buffer for storing a multi-word data block transferred from main memory for loading into the cache array via said second addressing/decoding means, and
   internal bus means on said chip having a band width equal to a complete multi-word data block to be accessed in a single associative set within said array connected between the array, the Store-Back Buffer and the Cache-Reload Buffer, and
   control means associated with both said Cache-Reload Buffer and said Store-Back Buffer means to indicate when the Cache-Reload Buffer has been fully loaded from main memory and for indicating when the store-back buffer has transferred its complete contents to main memory and wherein the memory/cache bus has a narrower band width than said internal cache chip bus.

17. A VLSI cache memory subsystem chip as set forth in claim 16 and further including;
   load-thru means comprising a data path for transferring an addressed logical word directly from main memory to the CPU externally of said array after the complete data block including said logical word is transferred from main memory to the chip,
   said Cache-Reload Buffer includes control means including a reload address register and means for interrogating the contents of said register on every normal read/write cache access from the CPU to determine if a requested data word is currently stored in said Cache-Reload Buffer, and
   means for accessing the addressed word in the Cache-Reload Buffer for read/write operations between the CPU and the cache chip, and
   wherein the late-select mechanism includes means for detecting a late-select timing signal to activate the late-select operating mode in the array and means for decoding the late-select signal to determine which associative set is to be selected for any CPU access, main memory reload or store-back access.

* * * * *